United States Patent
Hicks et al.

(10) Patent No.: US 7,416,204 B2
(45) Date of Patent: Aug. 26, 2008

(54) LIGHTWEIGHT NARROW-SPAN FIFTH WHEEL

(75) Inventors: William J. Hicks, Muskegon, MI (US); Roger L. Elkins, Rockford, MI (US); Steven C. Dupay, Holland, MI (US); Mark M. Audo, Muskegon, MI (US); Samuel A. Martin, Holland, MI (US)

(73) Assignee: SAF-Holland, Inc., Holland, MI (US)

( * ) Notice: Subject to any disclaimer, the term of this patent is extended or adjusted under 35 U.S.C. 154(b) by 867 days.

(21) Appl. No.: 10/253,251

(22) Filed: Sep. 24, 2002

(65) Prior Publication Data

US 2003/0047906 A1 Mar. 13, 2003

Related U.S. Application Data

(63) Continuation-in-part of application No. PCT/US01/18437, filed on Jun. 7, 2001, application No. 10/253,251, filed on Sep. 24, 2002.

(60) Provisional application No. 60/324,310, filed on Sep. 24, 2001, provisional application No. 60/210,633, filed on Jun. 9, 2000.

(51) Int. Cl.
*B62D 53/06* (2006.01)

(52) U.S. Cl. .................. 280/433; 280/438.1; 280/797; 280/124.128

(58) Field of Classification Search .............. 280/433, 280/434, 437, 438.1, 439, 440, 441, 204, 280/242, 202, 288.4, 291, 304.3, 160.1, 852, 280/495, 124.128, 797; 180/219; 224/423, 224/429, 430, 436, 440; 293/105, 106; D12/161

See application file for complete search history.

(56) References Cited

U.S. PATENT DOCUMENTS

| 1,175,046 | A | | 3/1916 | Byron |
| 1,258,486 | A | | 3/1918 | Smith et al. |
| 1,510,356 | A | | 9/1924 | Uffert et al. |
| 1,547,263 | A | | 7/1925 | Pomeroy |
| 1,564,739 | A | | 12/1925 | Winn |
| 1,638,948 | A | | 8/1927 | Masury et al. |
| 1,761,334 | A | | 6/1930 | Fry |
| 2,015,313 | A | * | 9/1935 | Kinne .................. 280/437 |

(Continued)

FOREIGN PATENT DOCUMENTS

EP 0591715 4/1994

*Primary Examiner*—Anne Marie M. Boehler
(74) *Attorney, Agent, or Firm*—Price, Heneveld, Cooper, DeWitt & Litton, LLP

(57) ABSTRACT

A short span fifth wheel hitch comprising a hitch plate, at least one back rib, a peripheral flange connected to ends of the back rib, and a main rib extending between the back rib and a portion of the peripheral flange, with the main rib being connected to ends of the peripheral flange. The fifth wheel hitch also includes skirts extending from the hitch plate adjacent the back rib. At least two pairs of mounting ribs are located interior of the peripheral flange and the back rib, each pair of mounting ribs including aligned apertures for accepting a mounting pin therein, whereby a mounting bracket can be inserted into a space between the mounting ribs of each pair of mounting ribs and the mounting pin can be placed through the aligned apertures and the mounting bracket to connect the fifth wheel hitch to a tractor.

19 Claims, 18 Drawing Sheets

U.S. PATENT DOCUMENTS

| | | | | |
|---|---|---|---|---|
| 2,127,313 | A | 8/1938 | Sowle | |
| 2,351,233 | A | 6/1944 | Schon | |
| 2,653,829 | A | 9/1953 | Sheehan | |
| 2,724,611 | A | 11/1955 | Robertson | |
| 2,794,650 | A | 6/1957 | Schilberg | |
| 3,002,766 | A * | 10/1961 | Harris | 280/423.1 |
| 3,022,091 | A | 2/1962 | Braunberger | 280/434 |
| 3,117,772 | A * | 1/1964 | Brown | 267/269 |
| 3,246,912 | A * | 4/1966 | Cunha | 280/407 |
| 3,279,815 | A | 10/1966 | Hutchens | |
| 3,318,616 | A * | 5/1967 | Fontaine et al. | 280/434 |
| 3,476,405 | A * | 11/1969 | Cunha | 280/476.1 |
| 3,484,852 | A * | 12/1969 | Reynolds et al. | 280/476.1 |
| 3,520,557 | A * | 7/1970 | Gies et al. | 280/432 |
| 3,580,611 | A | 5/1971 | McNitt | |
| 3,622,171 | A | 11/1971 | Gottschalk | |
| 3,873,120 | A | 3/1975 | Lecomte et al. | |
| 3,902,734 | A | 9/1975 | Fier | |
| 3,921,999 | A | 11/1975 | Masser | |
| 4,040,640 | A | 8/1977 | Begg | |
| 4,160,558 | A | 7/1979 | Fritsch | |
| 4,371,190 | A | 2/1983 | Vandenberg | |
| 4,429,892 | A * | 2/1984 | Frampton et al. | 280/407 |
| 4,570,973 | A | 2/1986 | Ewers et al. | |
| 4,697,844 | A | 10/1987 | Giles | |
| 4,718,692 | A | 1/1988 | Raidel | |
| 4,762,334 | A | 8/1988 | Altherr | |
| 5,039,124 | A | 8/1991 | Widmer | |
| 5,088,763 | A | 2/1992 | Galazin et al. | |
| 5,205,587 | A | 4/1993 | Orr | |
| 5,335,932 | A | 8/1994 | Pierce | |
| 5,338,050 | A * | 8/1994 | Haire et al. | 280/476.1 |
| 5,354,165 | A | 10/1994 | Booher | |
| 5,368,324 | A | 11/1994 | Kaim | |
| 5,375,871 | A | 12/1994 | Mitchell et al. | |
| 5,378,006 | A | 1/1995 | Stuart et al. | |
| 5,516,138 | A * | 5/1996 | Fontaine | 280/434 |
| 5,611,570 | A | 3/1997 | Garcia | |
| 5,720,489 | A | 2/1998 | Pierce et al. | |
| 5,722,688 | A | 3/1998 | Garcia | |
| 5,741,026 | A | 4/1998 | Bonnville | |
| 5,791,681 | A | 8/1998 | VanDenberg | |
| 5,848,807 | A | 12/1998 | Dubay et al. | |
| 5,894,908 | A | 4/1999 | Eftefield | |
| 5,988,665 | A * | 11/1999 | Terry et al. | 280/434 |
| 6,135,470 | A * | 10/2000 | Dudding | 280/124.128 |
| 6,199,889 | B1 * | 3/2001 | Golembiewski et al. | 280/433 |
| 6,495,774 | B1 * | 12/2002 | Pederson | 177/136 |

* cited by examiner

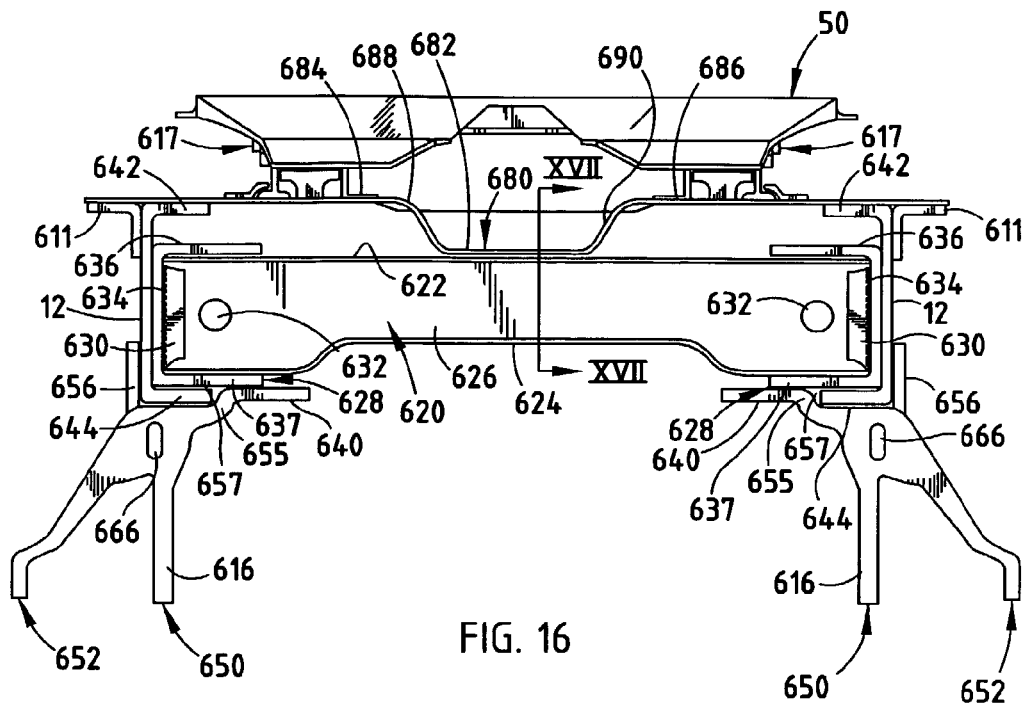
FIG. 16
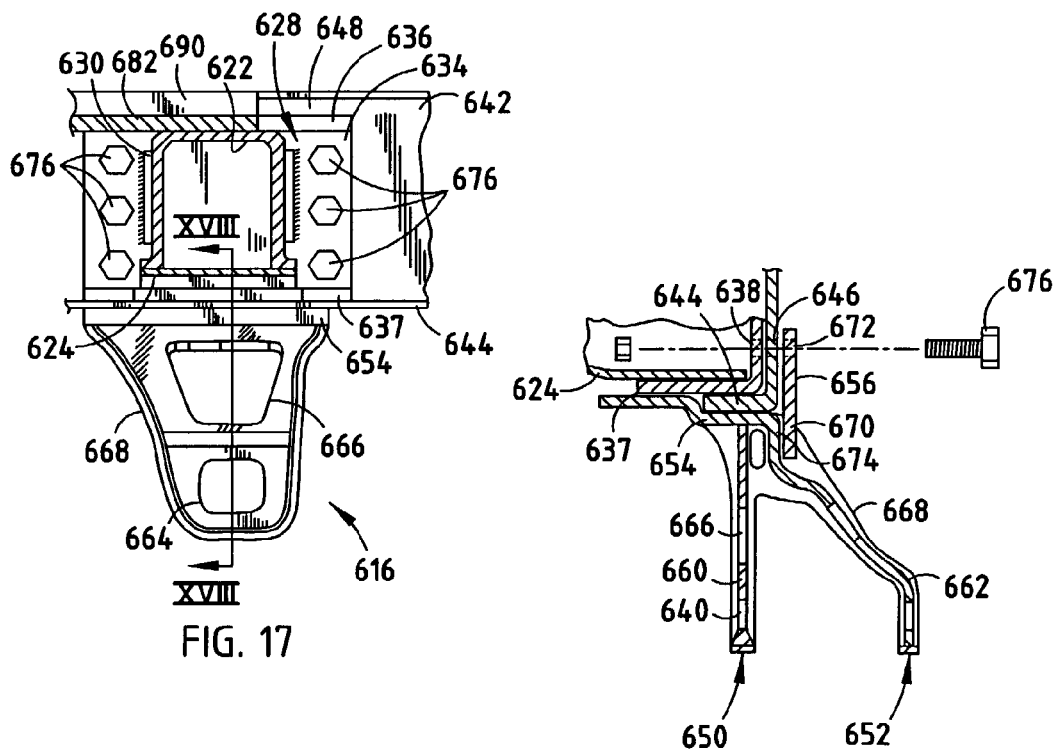
FIG. 17
FIG. 18

LIGHTWEIGHT NARROW-SPAN FIFTH WHEEL

CROSS-REFERENCE TO RELATED APPLICATIONS

This application is a continuation-in-part of PCT International Application No. PCT/US01/18437 filed in the United States on Jun. 7, 2001 designating the United States of America, which claims priority to U.S. Provisional Patent Application No. 60/210,633 filed on Jun. 9, 2000. This application also claims priority to U.S. Provisional Patent Application No. 60/324,310 entitled Lightweight Narrow-Span Fifth Wheel and Base Plate Assembly, which was filed on Sep. 24, 2001.

BACKGROUND OF THE INVENTION

The present invention relates to fifth wheel, and in particular to a lightweight narrow-span fifth wheel.

FIG. 2 illustrates a prior construction of a tractor frame and mounting system 10 for tractor/trailers. The prior construction tractor frame and mounting system 10 includes a pair of parallel frame rails 12 spaced 34 inches apart that support a suspension 14, a drive train (not shown) and a coupling apparatus 16 for connecting a trailer to the tractor. FIG. 2 illustrates truncated frame rails 12. Therefore, while the frame rails 12 are illustrated as ending under a deck 17, the rails 12 continue in front of the deck 17 and extend under the cab of the tractor and support the cab and the engine of the tractor. The coupling apparatus 16 includes a fifth wheel hitch 20 (see also FIG. 1). The coupling apparatus 16 further includes a mounting bracket and base plate assembly 18 configured to connect the fifth wheel hitch 20 to the frame rails 12. The mounting bracket and base plate assembly 18 includes a pair of oppositely facing, inverted L-shaped brackets 22 connected to ends of a base plate 24. The base plate 24 is a planar sheet of steel and includes a pair of mounting brackets 26 extending upwardly from a top surface of the base plate 24. The coupling apparatus 16 is connected to the frame rails 12 by placing ends of the base plate 24 over the top surface of the frame rails 12 and by inserting fasteners (not shown) through vertical legs of the L-shaped brackets 22 and into outside faces of the frame rails 12. Therefore, the L-shaped brackets 22 assist in connecting the coupling apparatus 16 to the frame rails 12 of the tractor. Each mounting bracket 26 of the mounting bracket and base plate assembly 18 includes an elongated aperture 28 therein configured to accept conventional attachment structure (not shown) for connecting the fifth wheel hitch 20 to the base plate 24. The elongated apertures 28 are co-linear and the distance between the center of each aperture 28 is typically 30 inches. The fifth wheel hitch 20 is configured to accept a pin of a trailer to connect the trailer to the tractor. The mounting brackets 26 are also positioned over the frame rails 12. Since the fifth wheel hitch 20 accepts the pin within a center opening 30, the primary load of the trailer rests on the top surface of the fifth wheel hitch 20. Therefore, the primary load of the trailer is on the mounting bracket and base plate 24 at the center of the base plate 24. The load from the trailer is transferred to the attachment points of the mounting bracket and base plate assembly 18 to the frame rails 12 through heavy ribs and other structure that act as a beam.

The prior construction fifth wheel hitch 20 (FIG. 1) includes a hitch plate 11 defining the throat 30 for receiving a kingpin. The hitch plate 11 has a bottom face 15 and has a thickness of about 0.45 inches. Back ribs 27 extend from the bottom face 15 of the hitch plate 11 and have a thickness of about 0.625 inches. A peripheral flange 19 extends from a periphery of the bottom face 15 of the hitch plate 11 and is connected to ends of the back ribs 27. A main rib 21 extends from the bottom face 15 of the hitch plate 11 between the back ribs 27 and a portion of the peripheral flange 19, with the main rib 21 being connected to ends 23 of the peripheral flange 25. The main rib 21 has a thickness of about 0.75 inches. Skirts 29 extend from the hitch plate 11 adjacent the back rib 27 and define a tapered mouth 31 leading to the throat 30. Skirt ribs 33 are positioned on the skirts 29 and have a thickness of about 0.45 inches. A mounting rib 35 is located interior of the peripheral flange 19 on each side of the throat 30. The mounting brackets 26 are connected to the fifth wheel hitch 20 by inserting the mounting brackets into a space 37 between the mounting rib 35 and the peripheral flange 19. A mounting pin (not shown) is inserted through aligned apertures in the peripheral flange 19 and the mounting rib 35 to connect the fifth wheel hitch 20 to the mounting brackets and the tractor.

The prior construction of the tractor frame and mounting system 10 for tractor/trailers typically has frame rails 12 with a 34 inch spacing between the center of the apertures 28 in the mounting brackets 26 for accommodating the weight load of the engine and the cab of the tractor. However, the 34 inch spacing of the frame rails 12 requires the fifth wheel hitch 20 to include heavy ribs for supporting the weight of the trailer in order to span the 34 inch distance and to transfer the load placed on the fifth wheel hitch 20 to the mounting brackets 26. The prior construction of the tractor frame and mounting system 10 includes numerous mounting brackets, angle brackets, base plates, slide plates, etc. which add to the weight of the tractor frame and mounting system 10 in addition to installation time.

Accordingly, a fifth wheel and mounting system solving the aforementioned disadvantages and having the aforementioned advantages is desired.

SUMMARY OF THE INVENTION

One aspect of the present invention is to provide a short span fifth wheel hitch comprising a hitch plate defining a throat for receiving a kingpin, with the hitch plate having a bottom face. At least one back rib extends from the bottom face of the hitch plate. A peripheral flange extends from a periphery of the bottom face of the hitch plate and is connected to ends of the at least one back rib. A main rib extends from the bottom face of the hitch plate between the at least one back rib and a portion of the peripheral flange, with the main rib being connected to ends of the peripheral flange. Skirts extend from the hitch plate adjacent the at least one back rib and defines a tapered mouth leading to the throat. At least two pairs of mounting ribs are located interior of the peripheral flange and the at least one back rib, with each pair of mounting ribs including aligned apertures for accepting a mounting pin therein. Therefore, a mounting bracket can be inserted into a space between the mounting ribs of each pair of mounting ribs and the mounting pin can be placed through the aligned apertures and the mounting bracket to connect the fifth wheel hitch to a tractor.

Yet another aspect of the present invention is to provide a mounting assembly for mounting a trailer to a tractor comprising a fifth wheel hitch and mounting brackets. The fifth wheel hitch comprises a hitch plate, at least one back rib, a peripheral flange, a main rib, skirts and at least two pairs of mounting ribs. The hitch plate defines a tapered mouth and throat for receiving a kingpin, with the hitch plate having a bottom face. The at least one back rib extends from the bottom face of the hitch plate. The peripheral flange extends from a periphery of the bottom face of the hitch plate and is connected to ends of the at least one back rib. The main rib extends from the bottom face of the hitch plate between the at least one back rib and a portion of the peripheral flange, with the main rib being connected to ends of the peripheral flange. The skirts extend from the hitch plate adjacent the at least one back rib. The at least two pairs of mounting ribs are located interior of the peripheral flange and the at least one back rib, with each pair of mounting ribs including aligned apertures for accepting a mounting pin therein. The mounting brackets are inserted into a space between each pair of mounting ribs and are configured to accept the mounting pin to connect the fifth wheel hitch to the mounting brackets.

In yet another aspect of the present invention, an improved semi-tractor comprising a pair of C-shaped frame rails extending between a front of the semi-tractor and a rear of the semi-tractor is provided, with the frame rails have a rail distance therebetween. The improvement comprises a fifth wheel hitch having mounting areas and mounting brackets. The mounting brackets engage the mounting areas of the fifth wheel hitch. An outside distance between the mounting areas is shorter than the rail distance.

Another aspect of the present invention is to provide a semi-tractor comprising an integral rear tractor portion, a fifth wheel hitch and mounting brackets. The integral rear tractor portion includes a horizontal support surface and structural side frame sections supporting the horizontal support surface. The structural side frame sections include axle supporting components for connecting a tractor axle to the integral rear tractor portion. The fifth wheel hitch has mounting areas, with the mounting areas have a center distance therebetween of less than 30 inches. The mounting brackets are connected to the horizontal support surface and define a mounting distance therebetween. The mounting brackets engage the mounting areas of the fifth wheel hitch.

These and other features, advantages, and objects of the present invention will be further understood and appreciated by those skilled in the art by reference to the following specification, claims and appended drawings.

BRIEF DESCRIPTION OF THE DRAWINGS

FIG. 16 is a rear view of the sixth mounting assembly of the present invention and conventional frame rails of a tractor.

FIG. 17 is a cross-sectional view taken along line XVII-XVII of FIG. 16.

FIG. 18 is a cross-sectional view taken along line XVIII-XVIII of FIG. 17.

DETAILED DESCRIPTION OF THE PREFERRED EMBODIMENTS

Figure 3:
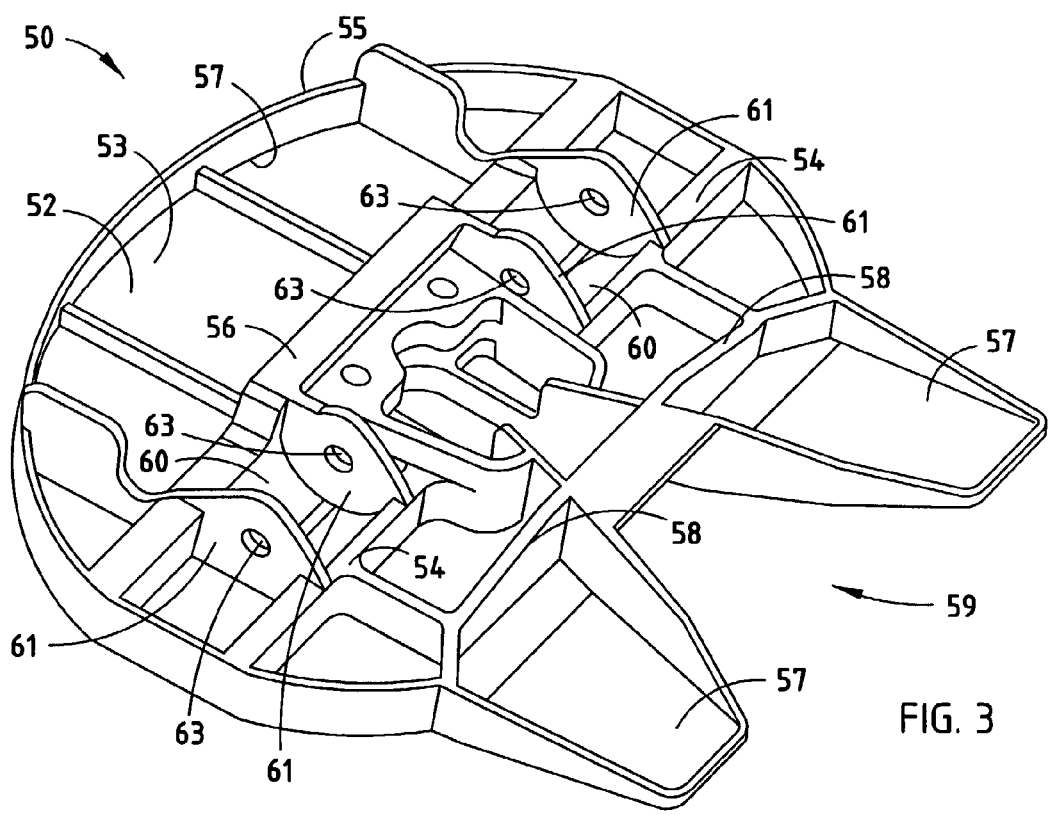
FIG. 3 is a bottom perspective view of the fifth wheel of the present invention.

For purposes of description herein, the terms "upper," "lower," "right," "left," "rear," "front," "vertical," "horizontal," and derivatives thereof shall relate to the invention as orientated in FIG. 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
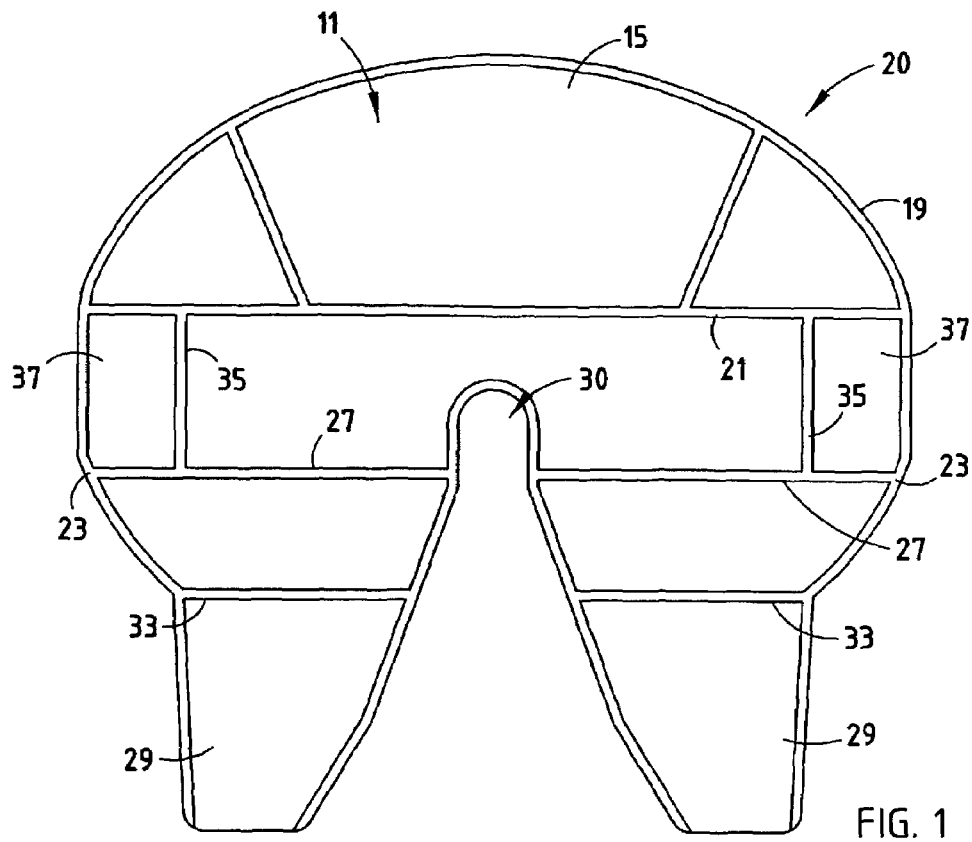
FIG. 1 is a bottom view of a prior construction of a fifth wheel.
Figure 2:
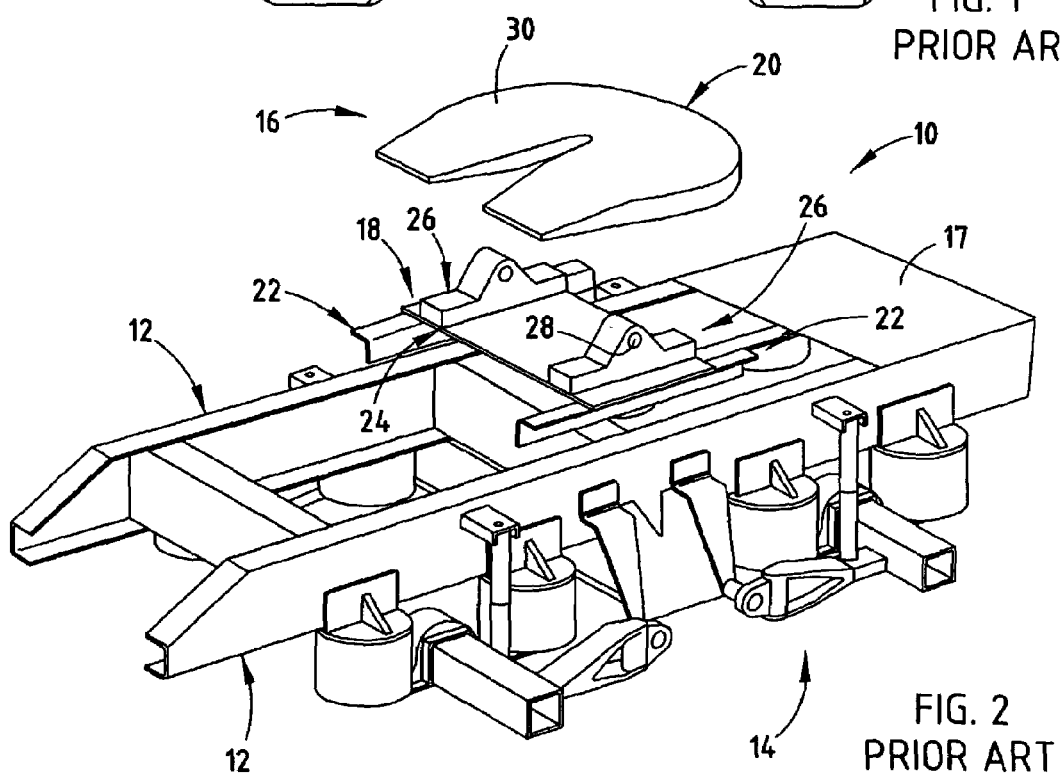
FIG. 2 is a perspective view of a prior construction tractor frame and mounting system.
Figure 4:
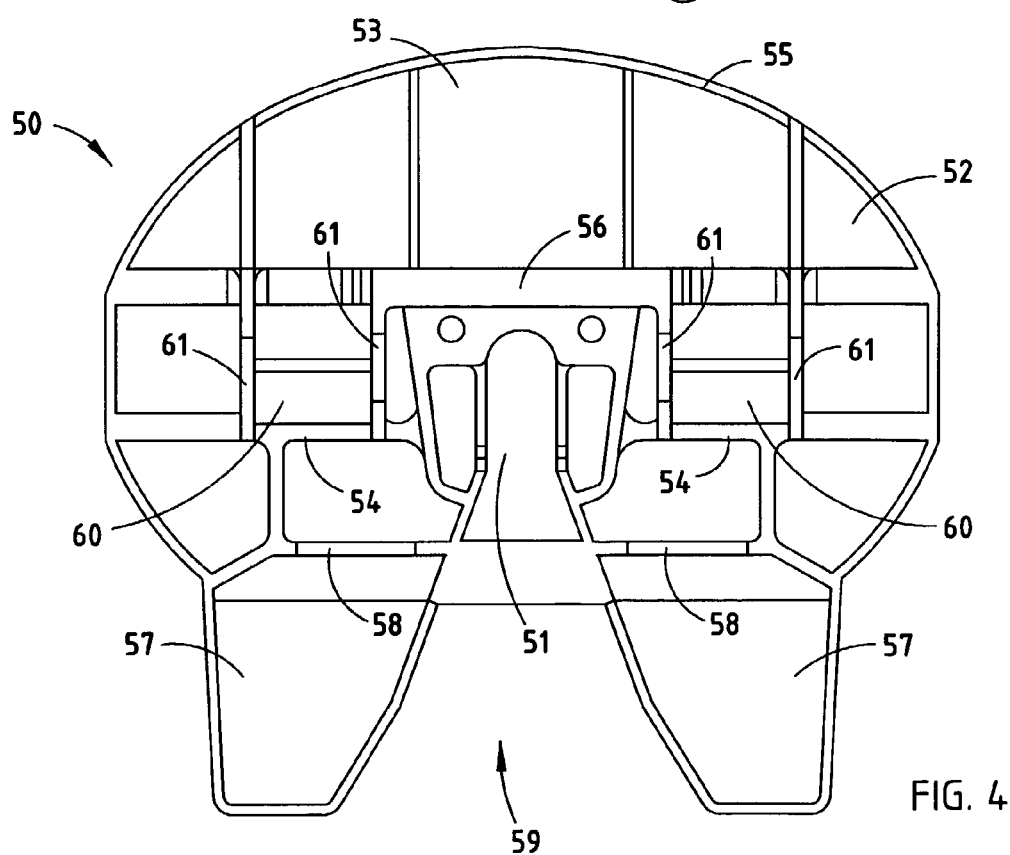
FIG. 4 is a bottom view of the fifth wheel of the present invention.

The reference number 50 (FIGS. 3-4) generally designates a lightweight narrow-span fifth wheel hitch embodying the present invention. In the illustrated example, the fifth wheel hitch 50 includes a hitch plate 52, skirt ribs 58, a main rib 56 and back ribs 54. The fifth wheel hitch 50 of the present invention is similar to the prior construction fifth wheel hitch 20, except that the fifth wheel hitch 50 of the present invention has small dimensions (compare the prior construction fifth wheel hitch 20 in FIG. 1 and the fifth wheel hitch 50 of the present invention in FIG. 4). The hitch plate 52 defines a throat 51 for receiving a kingpin (not shown), with the hitch plate 52 having a bottom face 53. The back ribs 54 extend from the bottom face 53 of the hitch plate 52 and a peripheral flange 55 extends from a periphery 57 of the bottom face 53 of the hitch plate 52 and is connected to ends of the back ribs 54. The main rib 56 also extends from the bottom face 53 of the hitch plate 52 between the back ribs 54 and a portion of the peripheral flange 55, with the main rib 56 being connected to the peripheral flange 55. Skirts 57 extend from the hitch plate 52 adjacent the back ribs 54 and define a tapered mouth 59 leading to the throat 51. At least two pairs of mounting ribs 61 are located interior of the peripheral flange 55 and the back ribs 54, with each pair of mounting ribs 61 including aligned apertures 63 for accepting a mounting pin therein. A mounting bracket (e.g., mounting brackets 102 in FIG. 3) can be inserted into a space, or pocket support area 60 between the mounting ribs 61 of each pair of mounting ribs 61 and the mounting pin can be placed through the aligned apertures 63 and the mounting bracket to connect the fifth wheel hitch 50 to a tractor. Although not shown, one skilled in the art will recognize that the fifth wheel hitch 50 will also include locking structure for locking the kingpin of the trailer within the throat 51. Such locking structure is well known to those skilled in the art.

Figure 6:
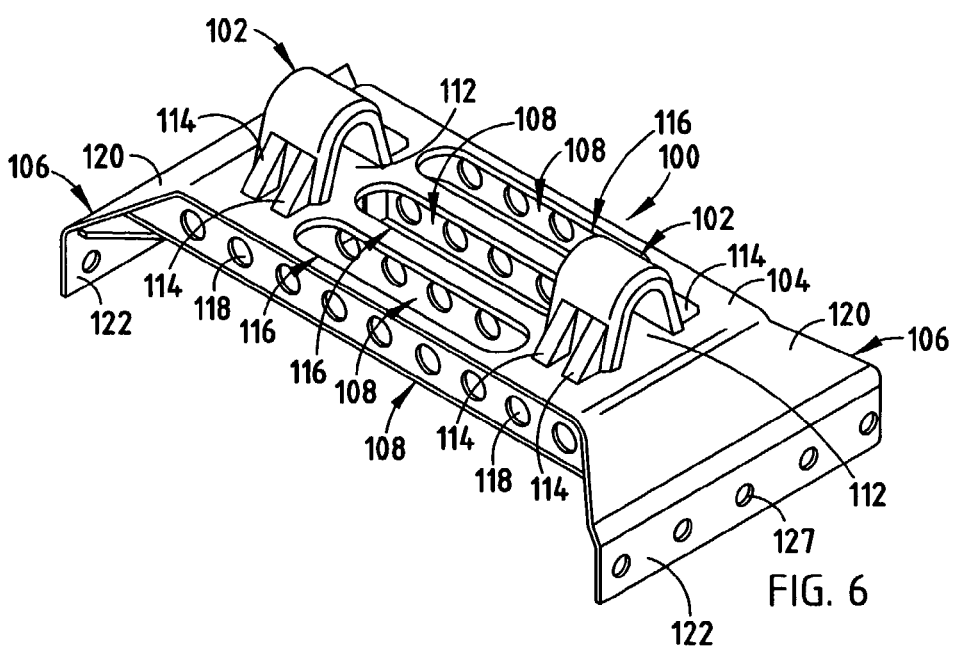
FIG. 6 is a perspective view of the first mounting assembly of the present invention.

The illustrated pocket support areas 60 of the fifth wheel 50 are configured to accept mounting brackets (see, for example, mounting brackets 102 in FIG. 6) to connect the fifth wheel 50 to the tractor. A distance between the outside boundaries of the pocket support areas 60, and therefore a distance between the outside boundaries of the mounting brackets, is approximately 23.8 inches and the width of the fifth wheel 50 is approximately 35.0 inches. Preferably, the distance between the centers of the pocket support areas 60 is 20 inches. However, the inventive fifth wheel 50 allows the mounting brackets, and therefore the pocket support areas 60, to be located closer together than previously allowed with the prior art conventional fifth wheel 20. Therefore, the pocket support areas of the fifth wheel 50 of the present invention preferably have an outside distance shorter than a distance between the frame rails 12 of the conventional construction of the tractor frame and mounting system 10. Accordingly, the pocket support areas 60 of the fifth wheel 50 of the present invention are preferably less than 30 inches (i.e., the typical spacing of the prior art fifth wheel 20 such that the centers of the pocket support areas of the prior art fifth wheel 20 are located over the frame rails 12). With the pocket support areas 60 having a center distance less than 30 inches, the center distance and the outside distance between the pocket support areas 60 are located within the spacing between the frame rails 12. Moreover, as discussed above, the pocket support areas preferably have a center distance of 20 inches, although any distance less than 30 inches is also desirable. The fifth wheel 50 is preferably made from cast or fabricated steel, although it is contemplated that the fifth wheel 50 can be made from other materials, including aluminum.

Mounting assemblies connecting the fifth wheel 50 to the tractor (described below) allow the fifth wheel 50 described above to have a reduced mass because the mounting brackets better transfer the load of the fifth wheel 50 to the frame rails of the tractor. The fifth wheel 50 and mounting assemblies of the present invention can support the same load as the prior construction coupling apparatus 16 (namely, at least 66,000 pounds) and is significantly lighter with generally reduced operating stresses, thereby also increasing durability of the fifth wheel 50 and mounting assemblies of the present invention. The mounting assemblies described directly below are examples of manners in which the fifth wheel 50 can be connected to the tractor and are not considered to be exhaustive. Additionally, the mounting assemblies can be connected or comprise either stationary or sliding fifth wheel assemblies.

Figure 5:
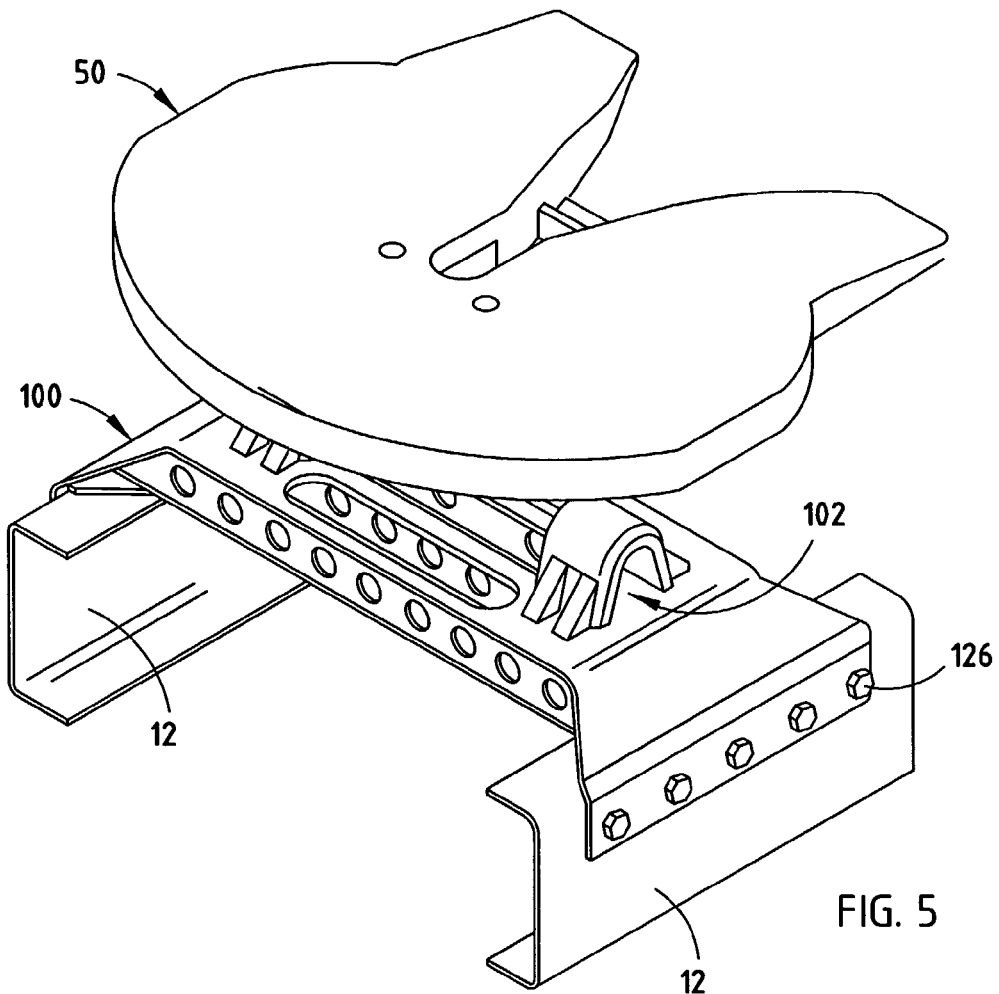
FIG. 5 is an exploded perspective view of a fifth wheel and first mounting assembly of the present invention.

The illustrated first mounting assembly 100 (FIGS. 5 and 6) includes a pair of mounting brackets 102 configured to be inserted into the pocket support areas 60 of the fifth wheel 50 to connect the fifth wheel 50 to the first mounting assembly 100. The first mounting assembly 100 includes a base plate 104, the mounting brackets 102 extending from a top surface of the base plate 104, a pair of side connecting flanges 106 extending from opposite sides of the base plate 104 and a plurality of support ribs 108 extending from a bottom surface of the base plate 104 and connected to the side connecting flanges 106 to provide rigidity to the first mounting assembly 100 and to transfer the load from the fifth wheel 50 to conventional frame rails 110 of the tractor. The fifth wheel 50 is connected to the first mounting assembly 100 by inserting the mounting brackets 102 into the pocket support areas 60 of the fifth wheel 50 and connecting the fifth wheel 50 to the mounting brackets 102 in a conventional manner. The mounting brackets 102 have an inverted U-shape configuration and define a pair of aligned openings 112. The mounting brackets 102 also include a pair of support flanges 114 extending from each side face of the mounting brackets 102 and the top surface of the base plate 104. The base plate 104 includes three oval holes 116 therein located between the mounting brackets 102. The support ribs 108 also include circular openings 118 therein. The oval holes 116 in the base plate 104 and the circular openings 118 in the support ribs 108 reduce the overall weight of the first mounting assembly 100. The side connecting flanges 106 have a first portion 120 having a trapezoidal shape, with the shorter parallel side connected to opposite sides of the base plate 104. The first portion 120 of the side connecting flanges 106 extend outward and downward from the base plate 104. The side connecting flanges 106 also include a second portion 122 having a rectangular configuration. As seen in FIG. 5, the first mounting assembly 100 is connected to conventional frame rails 110 of the trailer by placing ends of the support ribs 108 over a top surface 124 of the frame rails 110 and by inserting fasteners 126 through fastener openings in the second portions 122 of the side connecting flanges 106 and into side faces of the frame rails 110.

Figure 7A:
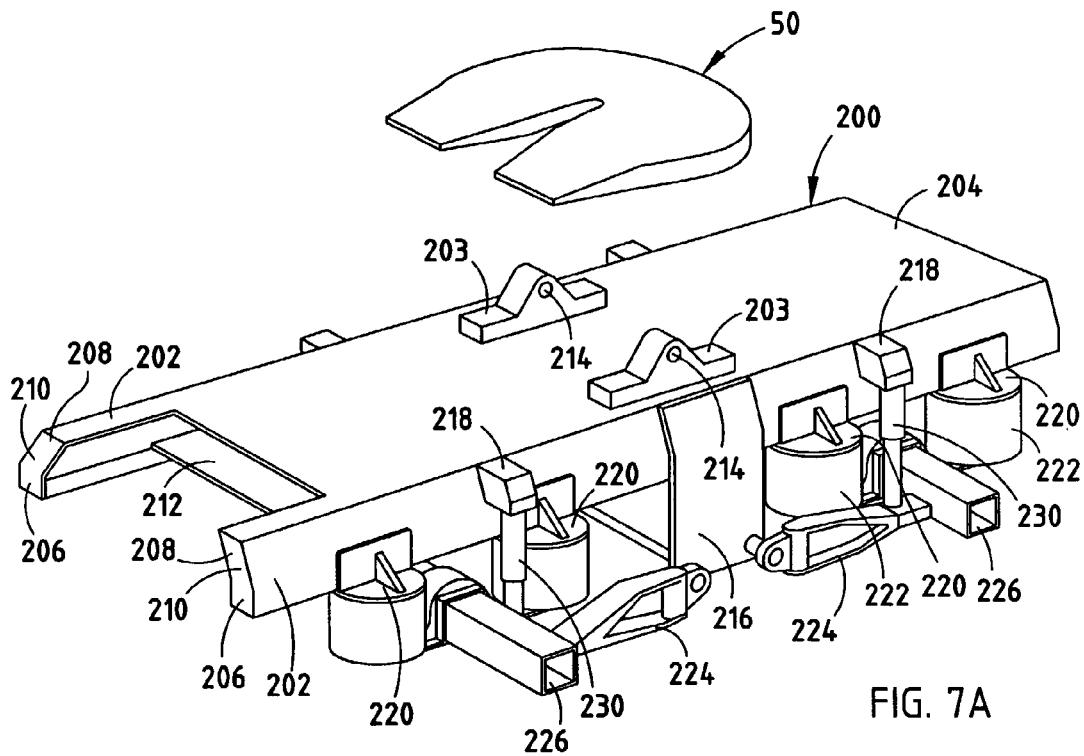
FIG. 7A is a perspective view of a second mounting assembly of the present invention.

The illustrated second mounting assembly 200 (FIG. 7A) includes an integral design for combining frame rails 202, a deck 204 and a pair of mounting brackets 203 configured to be inserted into the pocket support areas 60 of the fifth wheel 50 to connect the fifth wheel 50 to the second mounting assembly 200. The frame rails 202 of the second mounting assembly 200 can be substituted for the rear portion of the frame rails 12 of the conventional tractor.

In the illustrated example, the frame rails 202 include a lower vertical section 206 and an upper slanted section 208. The frame rails 202 are preferably hollow and have a foam composite core 210. The deck 204 is integral with a top surface of the frame rails 202 and extends between the frame rails 202. The deck 204 is preferably 26-28 inches in width. The second mounting assembly 200 also includes a plurality of support rails 212 extending between the frame rails 202 and connected to a bottom surface of the deck 204 for providing support for the deck 204. The mounting brackets 203 are similar to the mounting brackets 26 of the prior construction of a tractor frame and mounting system 10, with the mounting brackets 203 of the second mounting assembly 200 including elongated apertures 214 having a center distance of approximately 20 inches between them for insertion into the pocket support areas 60 of the fifth wheel 50.

The illustrated second mounting assembly 200 also preferably includes standard suspension components connected thereto. Therefore, the second mounting assembly 200 includes a centrally located torsion link mount 216 extending from the frame rails 202 outside of the mounting brackets 203. The second mounting assembly 200 also includes a pair of shock absorber mounts 218 extending from the upper slanted section 208 of the frame rails 202 and four air bag supports 220 extending from a bottom of the lower vertical section 206 of the frame rails 202, with one of the air bag supports 220 being located on each side of the shock absorber mounts 218. An air bag 222 is attached to the bottom of each of the air bag supports 220. A suspension link 224 is attached at one end to the torsion link mount 216 and at another end to a wheel axle housing 226 connected to two of the air bags 222. The suspension links 224 therefore are allowed to pivot relative to the torsion link mount 216. The shock absorber mounts 218 are positioned above the suspension links 224 and shock absorbers 230 are placed between the shock absorber mounts 218 and the suspension links 224 in order to slow the rotational movement of the suspension links 224 relative to the torsion link mount 216. The second mounting assembly 200 and the fifth wheel 50 of the present invention can weigh approximately 284 pounds less than the prior construction of a tractor frame and mounting system 10.

Figure 7B:
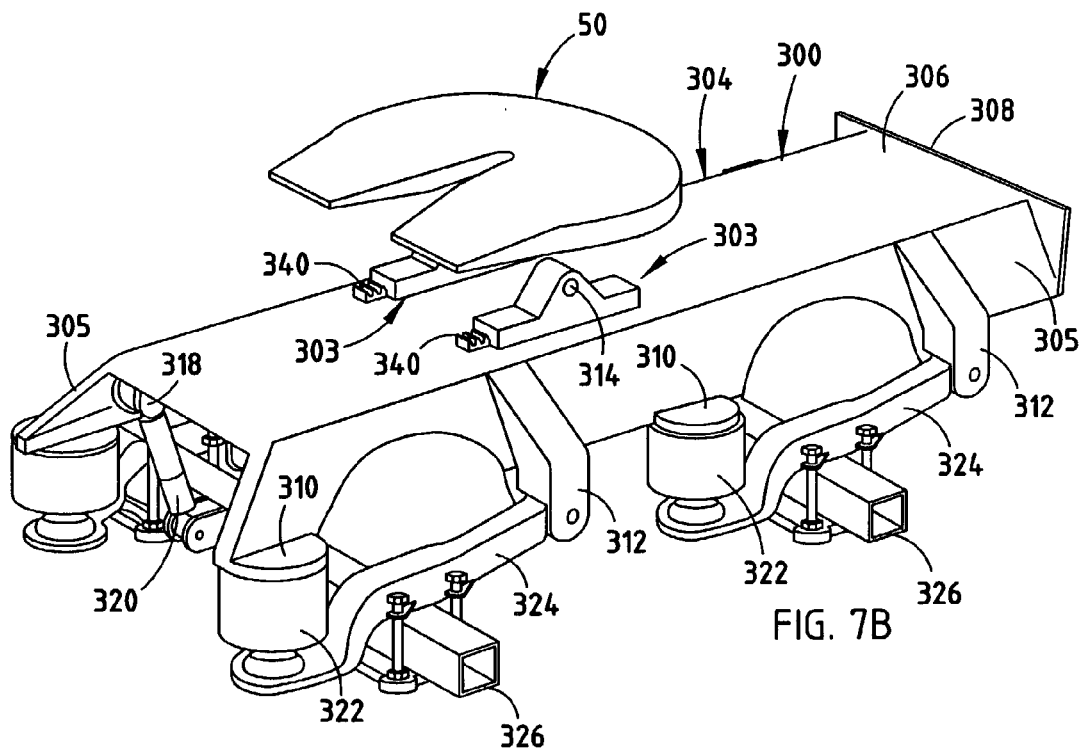
FIG. 7B is a perspective view of a third mounting assembly of the present invention.

The illustrated third mounting assembly 300 (FIG. 7B) is substantially similar in function to the second mounting assembly 200 and includes an integral design for combining a integral deck 304 and a pair of mounting brackets 303 configured to be inserted into the pocket support areas 60 of the fifth wheel 50 to connect the fifth wheel 50 to the third mounting assembly 300. The integral deck 304 of the third mounting assembly 300 can be substituted for the rear portion of the frame rails 12 of the conventional tractor.

In the illustrated example, the integral deck 304 includes a top support surface 306 having the mounting brackets 303 thereon, side slanted surfaces 305 and a front frame integration bulkhead 308 for connecting the integral deck 304 to a front portion of the tractor (not shown). The integral deck 304 is preferably made of a foam core composite. The top support surface 306 of the integral deck 304 is preferably approximately 24 inches in width. The mounting brackets 303 are similar to the mounting brackets 26 of the prior construction of a tractor frame and mounting system 10, with the mounting brackets 303 of the third mounting assembly 300 including elongated apertures 314 having a center distance of approximately 20 inches between them for insertion into the pocket support areas 60 of the fifth wheel 50. The top support surface 306 preferably includes adjustment structure 340 connected to the mounting brackets 303. The adjustment structure 340 allows the mounting brackets 303 to be moved forward and rearward on the top support surface 306. The adjustment structure 340 as disclosed herein is well known to those skilled in the art.

The illustrated third mounting assembly 300 also preferably includes standard suspension components connected thereto. Therefore, the third mounting assembly 300 includes airbag brackets 310 and trailing arm hanger brackets 312. Four of the air bag brackets 310 extend from a bottom of the side slanted surfaces 305 and an air bag 322 is attached to the bottom of each of the air bag brackets 310. A suspension link 324 is attached at one end to the trailing arm hanger bracket 312 and at another end to one of the air bags 322. A wheel axle housing 326 is also connected to the suspension link 324 between the air bag 322 and the trailing arm hanger bracket 312. The suspension links 324 therefore are allowed to pivot relative to the trailing arm hanger bracket 312. The third mounting assembly 300 also includes a pair of shock absorber mounts 318 extending from a bottom surface of the integral deck 304 at a position inside each side of the side slanted surfaces 305 and above each wheel axle housing 326. Shock absorbers 320 are placed between the shock absorber mounts 318 and the wheel axle housing 326 in order to slow the rotational movement of the suspension link 324 relative to the trailing arm hanger bracket 312.

The illustrated fourth mounting assembly 410 (FIGS. 8-11) is very similar to the second mounting assembly 200 and includes mounting brackets 422 connected to a top surface of a top plate 418 that are spaced the same as the mounting brackets 203 of the second mounting assembly 200. Therefore, the fifth wheel 50 of the present invention easily fits on the mounting brackets 422 of the fourth mounting assembly 410. The illustrated mounting assembly 410 (FIG. 8) includes a top shell 416 that has a planar top plate 418 and a pair of opposite side walls 420 angled outward and downward from opposite sides of the planar top plate 418. The planar top plate 418 includes a pair of aligned mounting brackets 422 attached to the top of the planar top plate 418 and a plurality of openings 424. The mounting brackets 422 each include an aligned opening 425 (see FIG. 9) for pivotal attachment to the fifth wheel 50. A first pair of suspension arms 428 extend downward from the side walls 420 adjacent the front of the rear frame 410. Likewise, a second pair of suspension arms 430 extend downward from the side walls 420 adjacent the middle of the rear frame 410. As explained in more detail below, the suspension arms 428, 430 are used to pivotally attach wheel axle housings 432 to the mounting assembly 410.

Figure 9:
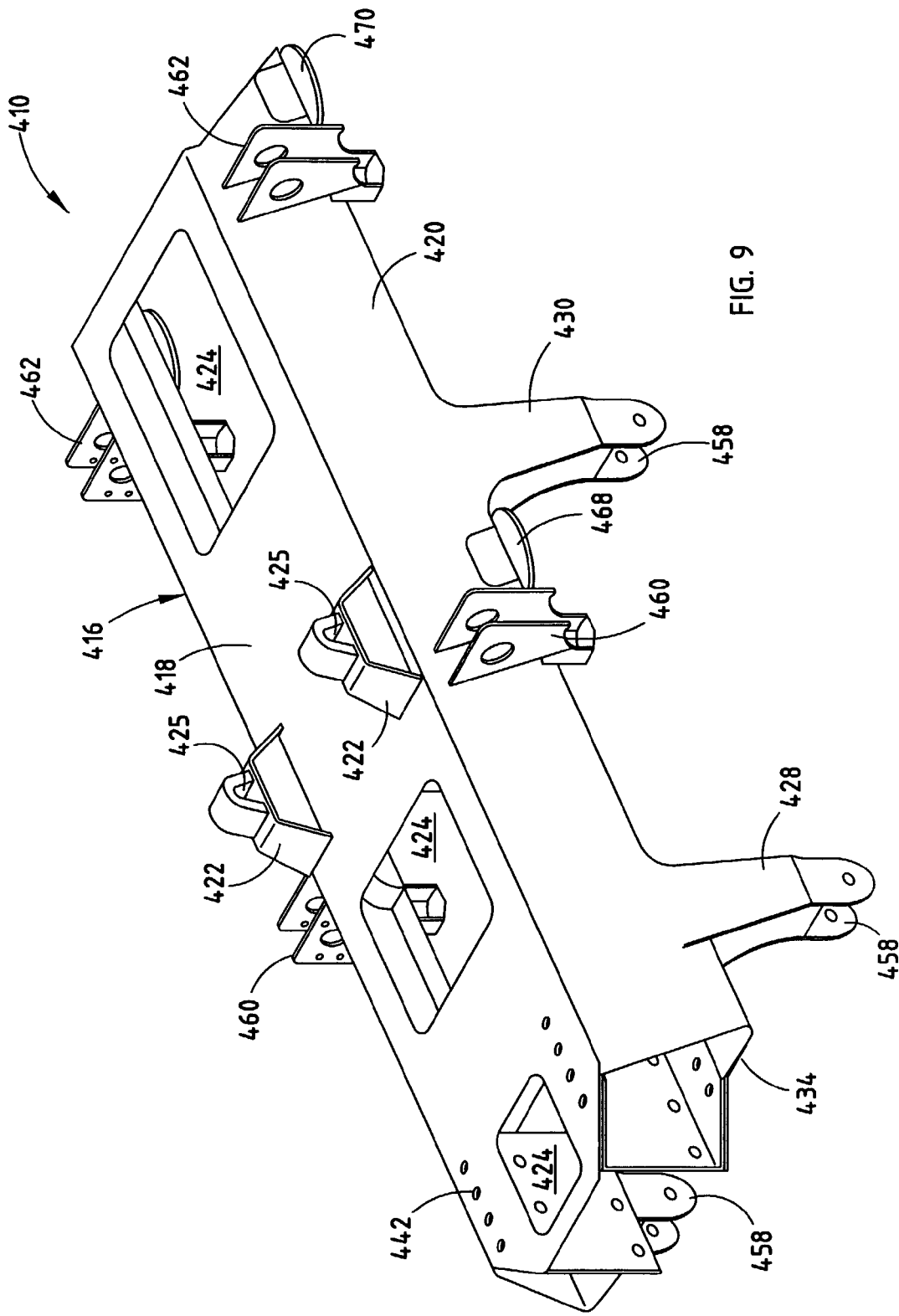
FIG. 9 is a perspective view of the fourth mounting assembly of the present invention with some components removed to show details of the fourth mounting assembly.
Figure 10:
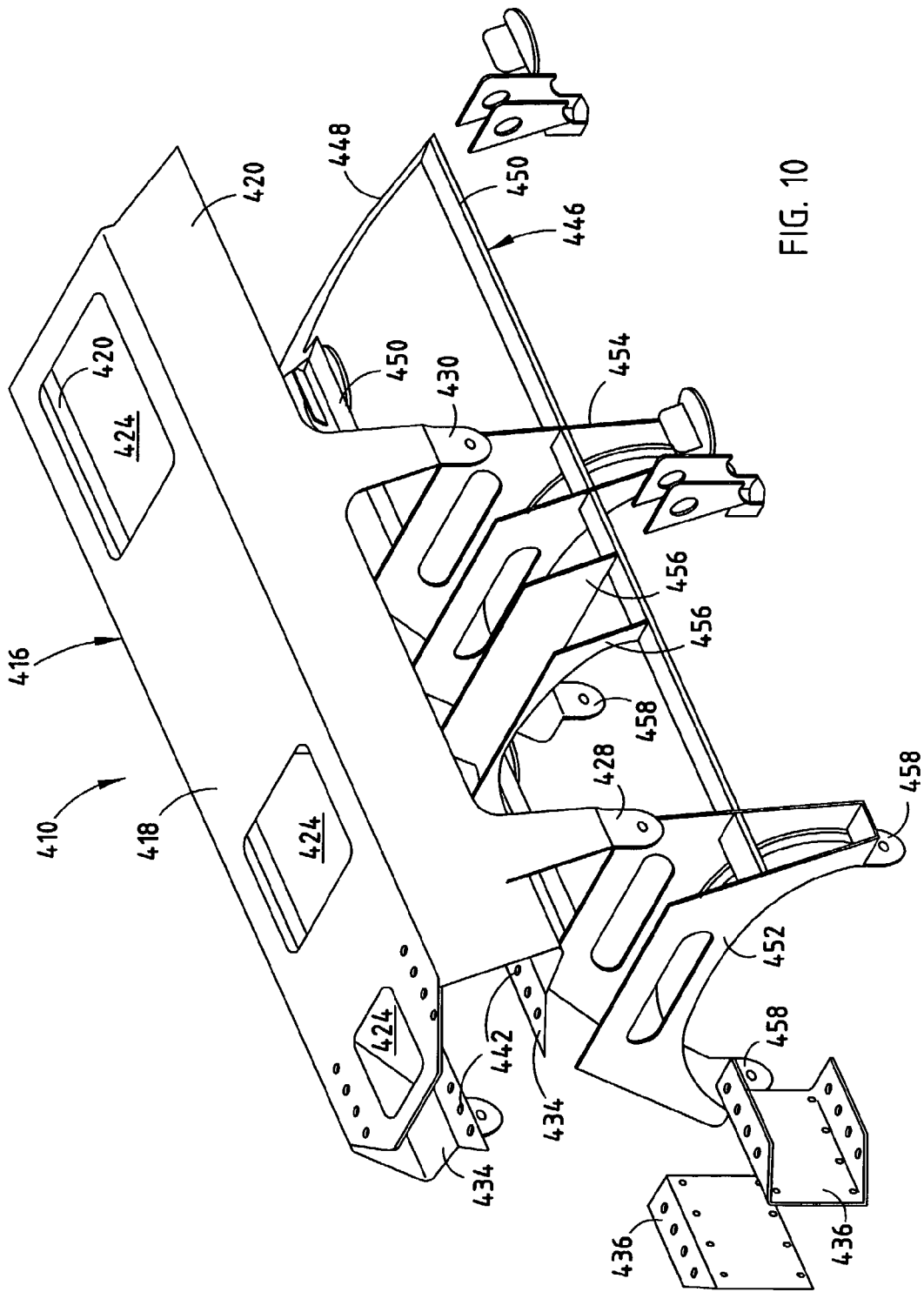
FIG. 10 is an exploded view of the fourth mounting assembly of the present invention with some components removed to show details of the fourth mounting assembly.
Figure 11:
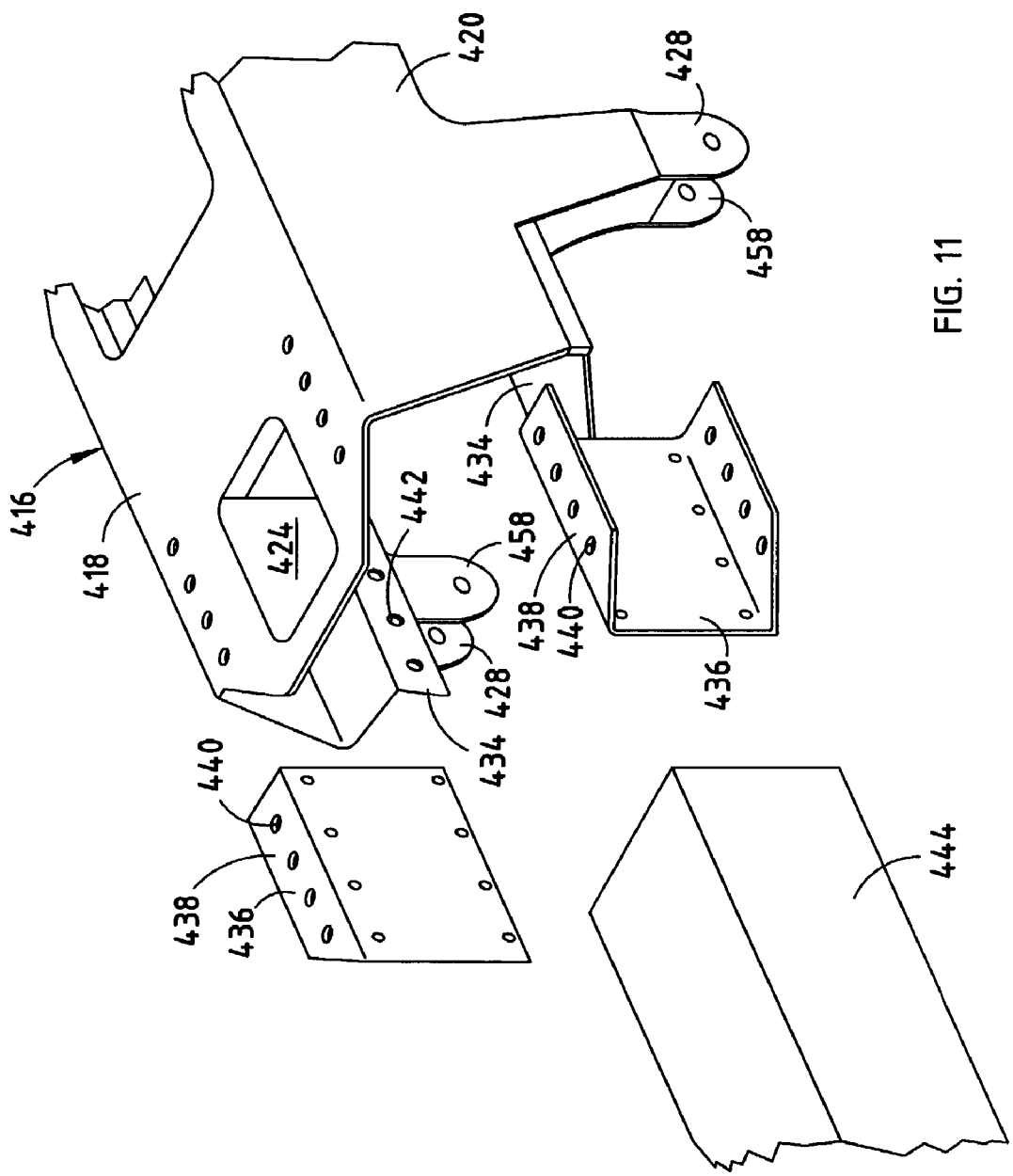
FIG. 11 is an exploded view of the fourth mounting assembly of the present invention with some components removed to show details of the fourth mounting assembly and frame rails of a tractor.

As illustrated in FIGS. 9-11, each side wall 420 also includes a bracket flange 434 at the front of the rear frame 410. The bracket flanges 434 extend inward toward each other. A pair of attachment brackets 436 are attached to the bracket flanges 434 and the top plate 418. The attachment brackets 436 are U-shaped and have opposite side walls 438 with aligned holes 440. The top plate 418 and the bracket flanges 434 each include a set of aligned holes 442 spaced the same distance as the aligned holes 440 on the attachment brackets 436. Fasteners (not shown) are placed through the holes 440, 442, whereby the attachment brackets 436 can be placed forward or rearward on the rear frame 410. The attachment brackets 436 are also connected to a center module 444 (FIG. 11) of the tractor, thereby attaching the rear frame 410 to the tractor.

The illustrated rear frame 410 also includes a lower frame 446 (FIG. 10). The lower frame 446 includes a back flange 448, a pair of parallel side flanges 450, a front hanger rim 452, a middle hanger rim 454 and two support ribs 456. The back flange 448 is located near the back of the rear frame 410 and the parallel side flanges 450 extend from the ends of the back flange 448 towards the front of the rear frame 410. The front hanger rim 452 is connected between the parallel side flanges 450 opposite the back flange 448. Likewise, the middle hanger rim 454 is connected between the parallel side flanges 450 in the middle of the side flanges 450. The support ribs 456 span the two parallel side flanges 450 and reinforce the bottom frame 446 and the top shell 416 at a position below the mounting brackets 422. The hanger rims 452, 454 each include a pair of hanger flanges 458 aligned inwardly of the suspension arms 428, 430 of the top shell 416.

Figure 8:
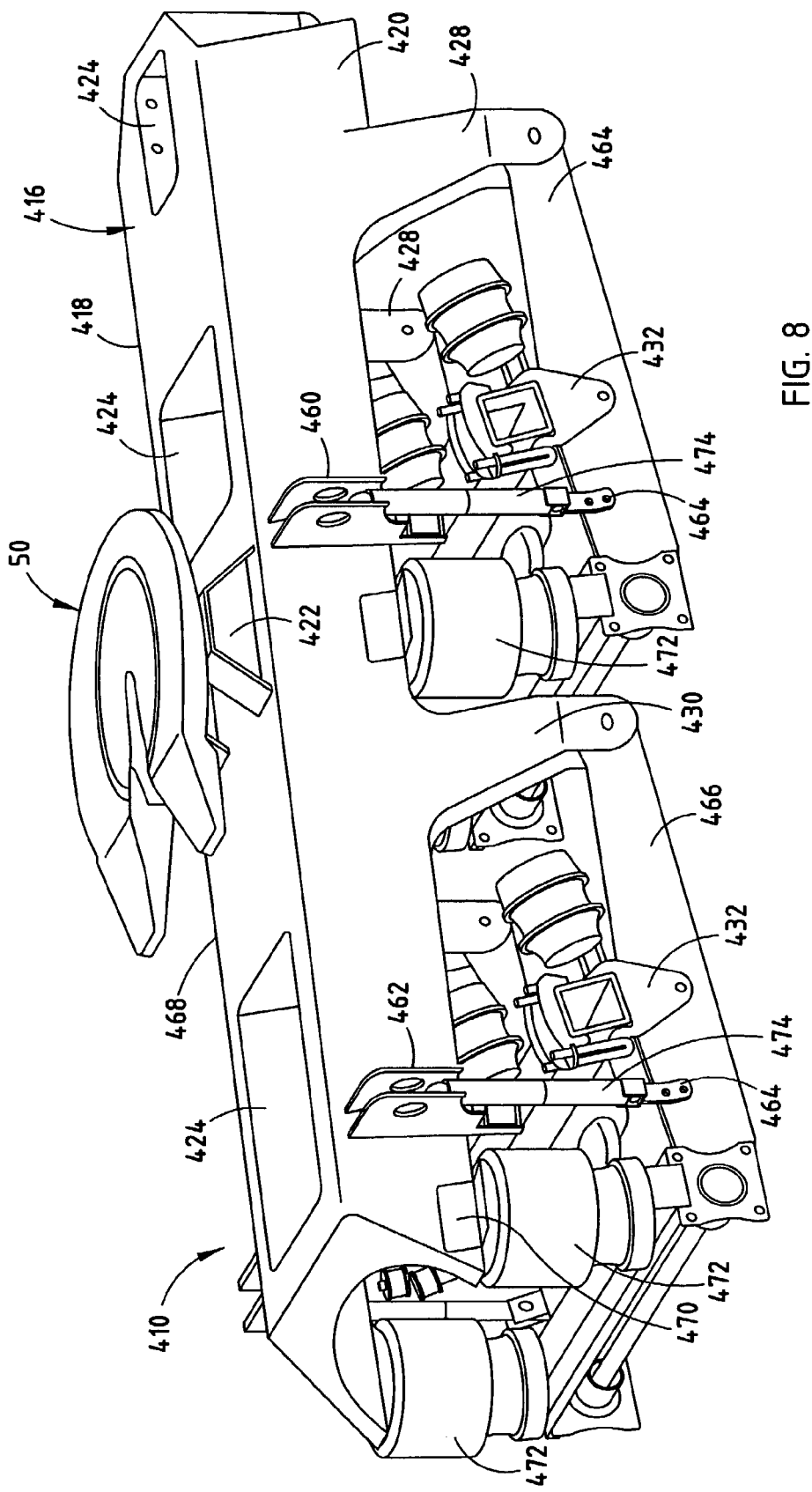
FIG. 8 is a perspective view of a fourth mounting assembly and fifth wheel of the present invention.

As illustrated in FIGS. 8 and 9, the rear frame 410 also includes a first pair of shock absorber mounts 460, a second pair of shock absorber mounts 462, a first pair of suspension links 464, a second pair of suspension links 466, a first pair of air bag supports 468 and a second pair of air bag supports 470. The first pair of air bag mounts 468 are attached to the side walls 420 of the top shell 416 adjacent the center of the side walls 420 and in front of the second pair of suspension arms 430. The second pair of air bag mounts 470 are attached to the side walls 420 of the top shell 416 adjacent the rear of the side walls 420. An air bag 472 is attached to the bottom of each of the air bag mounts 468, 470. The first pair of suspension links 464 are attached at one end to the bottom of the air bag 472 below the first pair of air bag supports 468. The other end of the first pair of suspension links 464 is pivotally attached to the first pair of suspension arms 428 and the hanger flanges 458 of the front hanger rim 452. Likewise, the second pair of suspension links 466 are attached at one end to the bottom of the air bag 472 below the second pair of air bag supports 470. The other end of the second pair of suspension links 466 is pivotally attached to the second pair of suspension arms 430 and the hanger flanges 458 of the middle hanger rim 454. The suspension links 464, 466 therefore are allowed to pivot relative to the suspension arms 428, 430. The first pair of shock absorber mounts 460 are attached to the side walls 420 of the top shell 416 at a position above the first pair of suspension links 464. Likewise, the second pair of shock absorber mounts 462 are attached to the side walls 420 of the top shell 416 at a position above the second pair of suspension links 466. Shock absorbers 474 are placed between the shock absorber mounts 460, 462 and the suspension links 464, 466 in order to slow the rotational movement of the suspension links 464, 466 relative to the top shell 416. Each pair of suspension links 464, 466 also include a wheel axle housing 430 extending therebetween for connecting wheel axles (not shown) to the rear frame 410.

Figure 12:
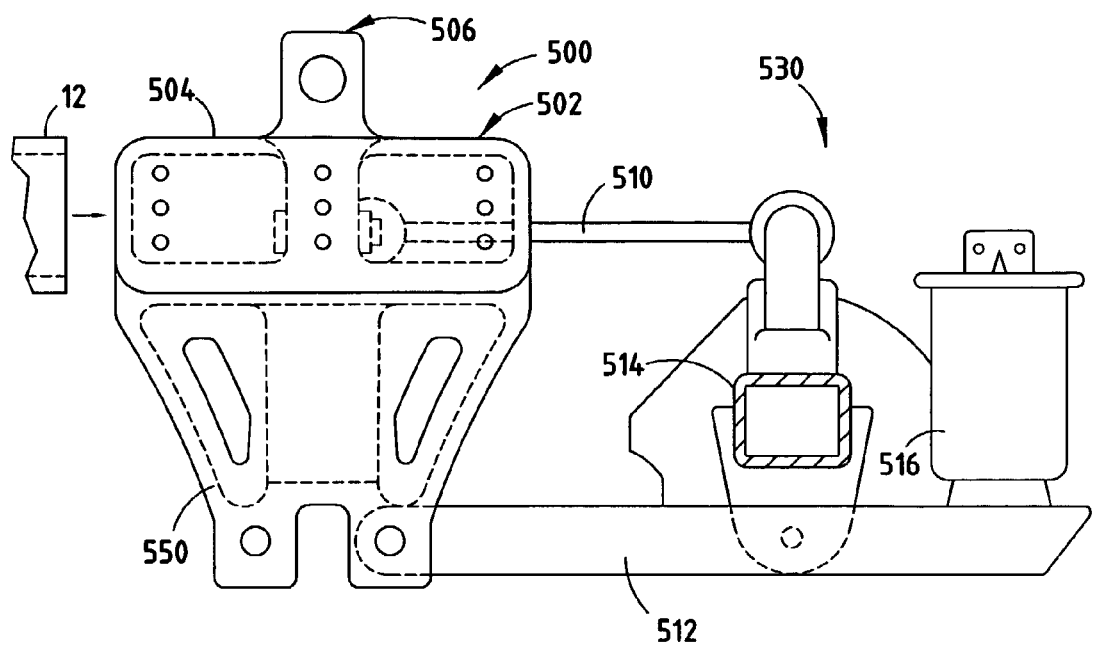
FIG. 12 is an exploded side view of a fifth mounting assembly of the present invention and conventional frame rails of a tractor.
Figure 13:
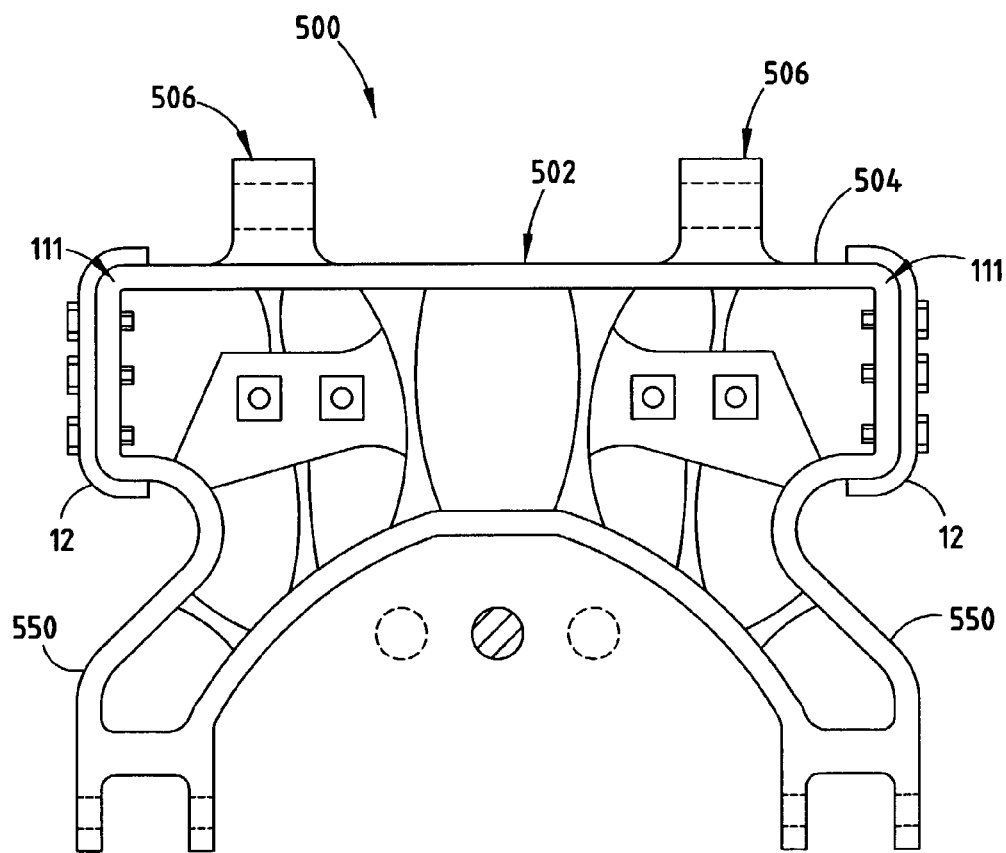
FIG. 13 is a rear view of the fifth mounting assembly of the present invention and conventional frame rails of a tractor.
Figure 14:
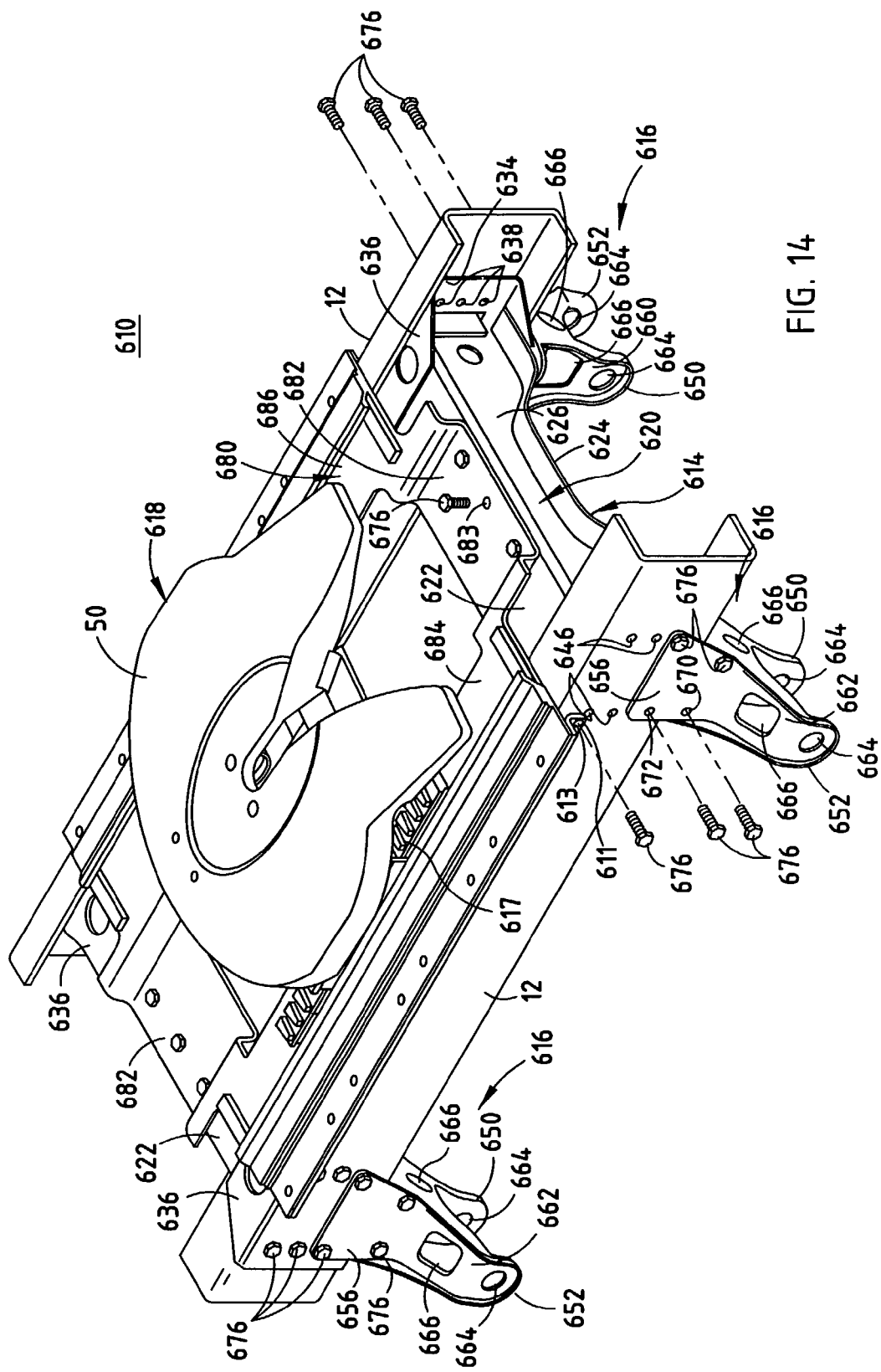
FIG. 14 is a perspective view of a sixth mounting assembly of the present invention and conventional frame rails of a tractor.
Figure 15:
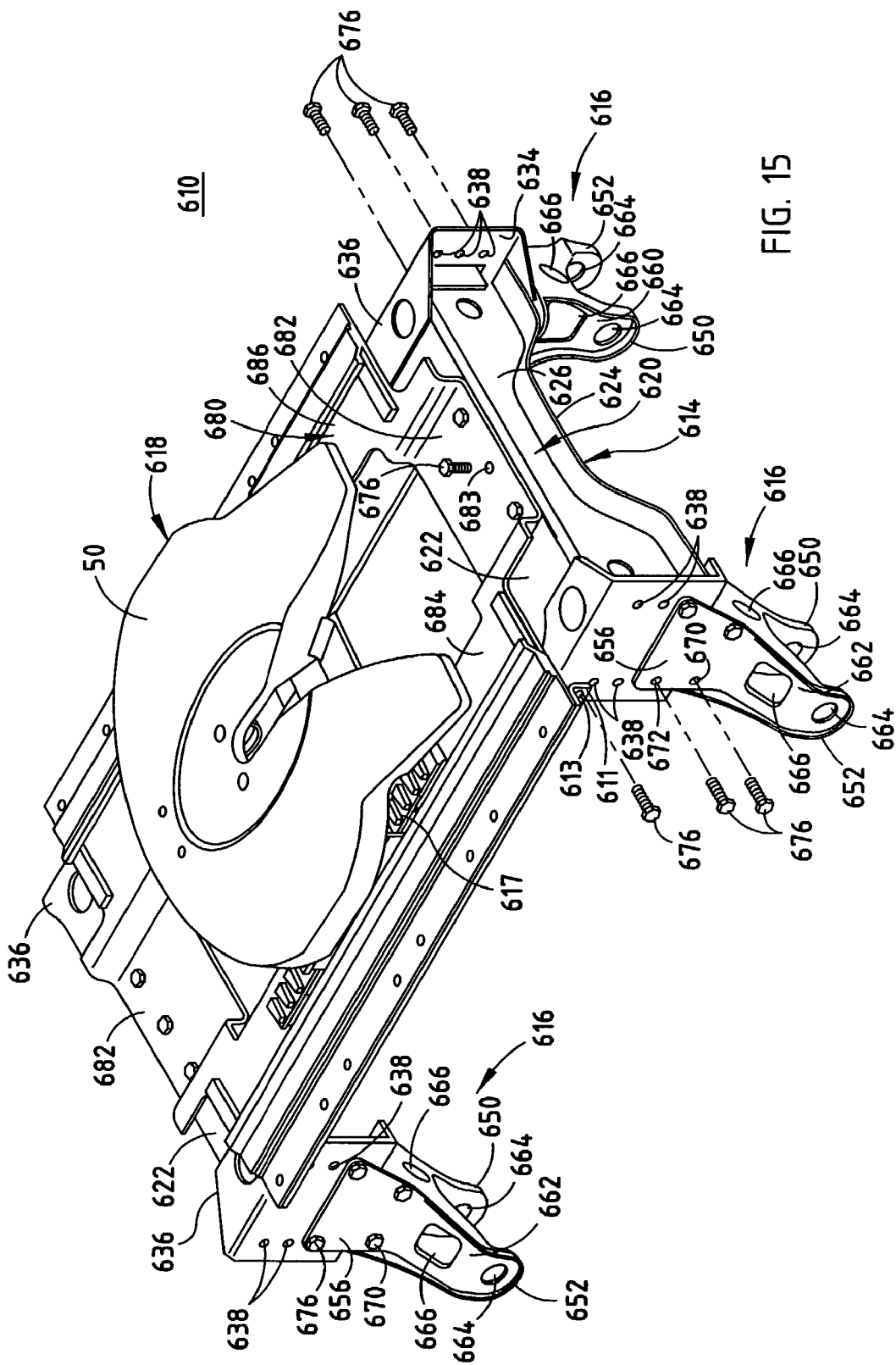
FIG. 15 is a perspective view of the sixth mounting assembly of the present invention and conventional frame rails of a tractor.

The illustrated fifth mounting assembly 500 (FIGS. 12 and 13) includes an integral design X-frame 502 configured to be inserted between the frame rails 12 of the conventional tractor within oppositely facing slots 111 defined by the facing C-shaped configuration of the frame rails 12. The X-frame 502 includes a top plate 504 and mounting brackets 506 situated thereon for acceptance into the fifth wheel 50 in the same manner as the mounting brackets 203 of the second mounting assembly 200. The X-frame 502 includes a control arm 510, an equalizing beam 512, an axle housing 514, and an air spring 516 connected to the equalizing beam 512 and adapted to be connected to the frame rails 12, thereby integrating a suspension assembly 530 with the fifth wheel 50. Although the suspension assembly 530 is shown as extending only rearwardly from the X-frame 502 in FIG. 12, a mirror image suspension assembly 530 extends forwardly from the X-frame 502 and is connected to a frame bracket 550, as is the rearwardly extending suspension assembly 530 shown in FIG. 12. The X-frame 502 is slid into the frame rails 12 and fasteners are inserted through the frame rails 12, and into the X-frame 502, thereby connecting the fifth mounting assembly 500 to the frame rails 12.

The illustrated sixth mounting assembly (FIGS. 14-19) comprises an integral fifth wheel and frame suspension 610, for attaching the fifth wheel 50 to conventional truck frame rails 12. The integral fifth wheel and frame suspension 610 comprises a cross member 614, at least one suspension bracket 616, and a fifth-wheel hitch assembly 618.

The cross member 614 comprises an inverted U-channel 620, including upper web 622 and two side flanges 626. The cross member 614 further comprises a lower flange 624 fixed to the side flanges 626, such as by welding or other mechanical means in a generally parallel relationship to the cross member web 622. The cross member 614 further comprises a pair of end caps 628 and a reinforcing gusset plate 630 affixing the end caps 628 to the side flanges 626 of the cross member 614. Each end cap 628 comprises a section of U-channel having an end cap web 634 and end cap flanges 636, a plurality of fastener apertures 638 being formed in the end cap web 634. The cross member 614 further comprises a plurality of apertures 632 formed in each side flange 626, proximate each end cap 628 and aligned with a corresponding aperture 632 on the opposing side flange 626.

Truck frame rails 12 are parallel inwardly facing U-channels comprising a rail web 640, an upper flange 642, and a lower flange 644. Rail web 640 further comprises a plurality of fastener apertures 646 passing therethrough for alignment with fastener apertures 638 of the end cap 628.

Suspension bracket 616 comprises a suspension bracket inner leg 650, a suspension bracket outer leg 652, and a suspension bracket upper portion 654. Suspension bracket inner leg 650 comprises an inner leg web 660 including a suspension mounting aperture 664 and a supplemental aperture 666 passing therethrough. The suspension bracket outer leg 652 comprises an outer leg web 662 having a suspension mounting aperture 664 and supplemental aperture 666 passing therethrough. Suspension mounting apertures 664 of the inner and outer leg webs 660, 662 are aligned. The suspension bracket 616 further comprises a common flange 668 passing about the exterior of the bracket and affixed to the inner leg web 660 and outer leg web 662 by welding or other mechanical means. The common flange 668 further includes supplemental apertures 666. The suspension bracket 616 further comprises an outer mounting plate 656 having mounting plate bracket apertures 670 and mounting plate rail apertures 672. The outer leg web 662 further comprises bracket plate apertures 674 passing therethrough.

Fifth-wheel hitch assembly 618 comprises a fifth-wheel hitch carriage 680 comprising central recessed portions 682 and parallel first and second longitudinal rail portions 684, 686. Rail portions 684, 686 are co-planar and are received on the upper flanges 642 of truck frame rails 12. Recessed portions 682 are planar and parallel to first and second rail portions 684, 686 and are integral therewith through first and second transition portion 688, 690. Recessed portions 682 further comprise apertures 683 for alignment with fastener apertures (not shown) in cross member upper web 622 for receiving mechanical fasteners such as bolts 676 to secure carriage 680 to cross members 614. Fifth wheel carriage 680 further comprises longitudinal angle brackets 611 having fastener apertures 613. Fifth-wheel hitch assembly 618 further comprises the fifth wheel 50 and adjustment rails 617 mounted on first and second rail portions 684, 686. Adjustment rails 617 are common in fifth wheel assemblies.

One of the suspension brackets 616 is affixed to each end of cross member 614. Upper portion 654 is affixed, by welding or mechanical fasteners, to lower flange 624 of the cross member 614 and lower end cap flange 637. Upper portion 654 of suspension bracket 616 includes an offset region 655. Upper portion 654 and end cap flange 637, when assembled, define a gap 657 for receiving rail lower flange 644. At least a second cross member 614 is likewise assembled with suspension brackets 616. Recessed portion 682 of fifth wheel carriage 680 is mounted to web 622 of cross member 614 by welding or other mechanical fasteners, holding cross members 614 in a fixed spacing parallel to each other and perpendicular to rail portions 684, 686.

The fifth wheel and frame suspension 610, comprising the fifth-wheel hitch assembly 618, at least two cross members 614, and suspension brackets 616 is mounted within truck rails 12 by sliding the assembly longitudinally between the truck rails 12. End caps 628 slide within truck frame rails 12 with each rail lower flange 644 residing in gap 657 between bracket upper portion 654 and end cap lower flange 637. End cap lower flanges 637 are thereby kept flush against rail lower flange 644 so that a gap 648 is formed between end cap flange 636 and rail upper flange 642. Carriage 680 is configured such that transition portions 688, 690 offset rail portions 684, 686 above recessed portion 682 to place rail portions 684, 686 in flush contact with the upper surface of rail upper flanges 642. Carriage 680 is thereby supported by rail upper flanges 642 and cross members 614, which are in turn supported at end caps 628 by suspension brackets 616. Rail lower flanges 644 are further supported by bracket upper portions 654.

With the fifth wheel and frame suspension 610 in place within the frame rails 12, apertures 638 align with apertures 646 in rail webs 640 for receiving a mechanical fastener such as a bolt 676, which is tightened to provide mechanical fastening. Further, bracket-plate apertures 674 are aligned with apertures 646 to correspond to the layout of apertures 670, 672 of outer mounting plate 656, so that outer mounting plate 656 is received against outer leg web 662 with mounting plate bracket apertures 670 aligned with bracket-plate apertures 674, and mounting plate rail apertures 672 aligned with truck frame rail apertures 646 for receiving a mechanical fastener such as bolts 676. Apertures 613 in angle bracket 601 are further aligned with apertures 646 in rail web 640 for receiving mechanical fasteners. Fifth wheel and frame suspension 610 is thus secured to frame rails 12 by mechanical fasteners securing end caps 628 to rail webs 640, and suspension brackets 616 to rail webs 640 through outer mounting plates 656. Carriage 80 is further secured to rails 12 through angle bracket 601. Whereas securing the fifth wheel and suspension 610 to rails 12 has been described as using mechanical fasteners passed through aligned apertures in the respective components, it is contemplated that other methods of securing, such as welding, can be used within the scope of the invention.

Figure 19:
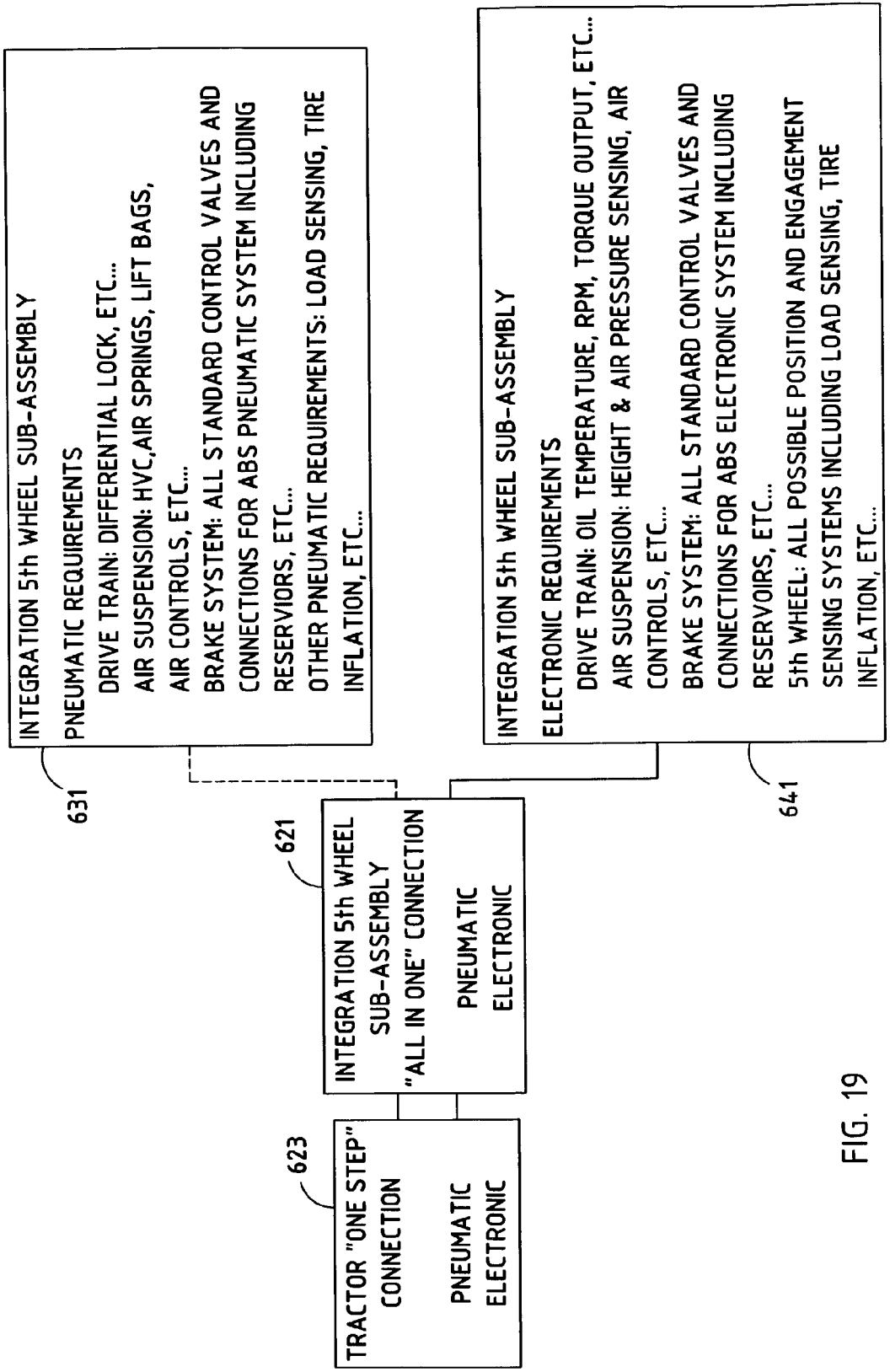
FIG. 19 is a schematic diagram of a pneumatic and electronic interface of the sixth mounting assembly of the present invention and conventional frame rails of a tractor.
Figure 20:
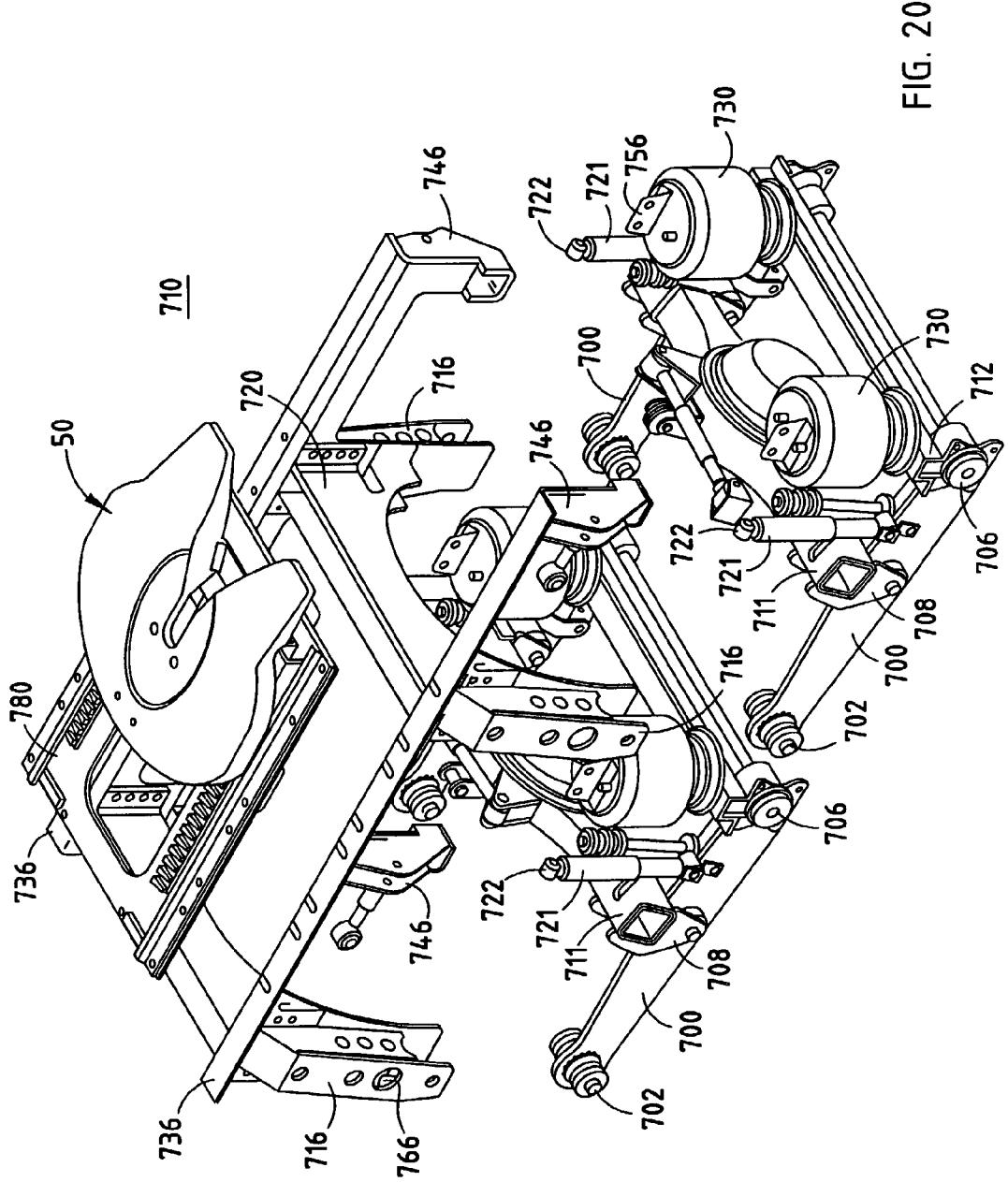
FIG. 20 is an exploded perspective view of a seventh mounting assembly of the present invention and conventional frame rails of a tractor.
Figure 21:
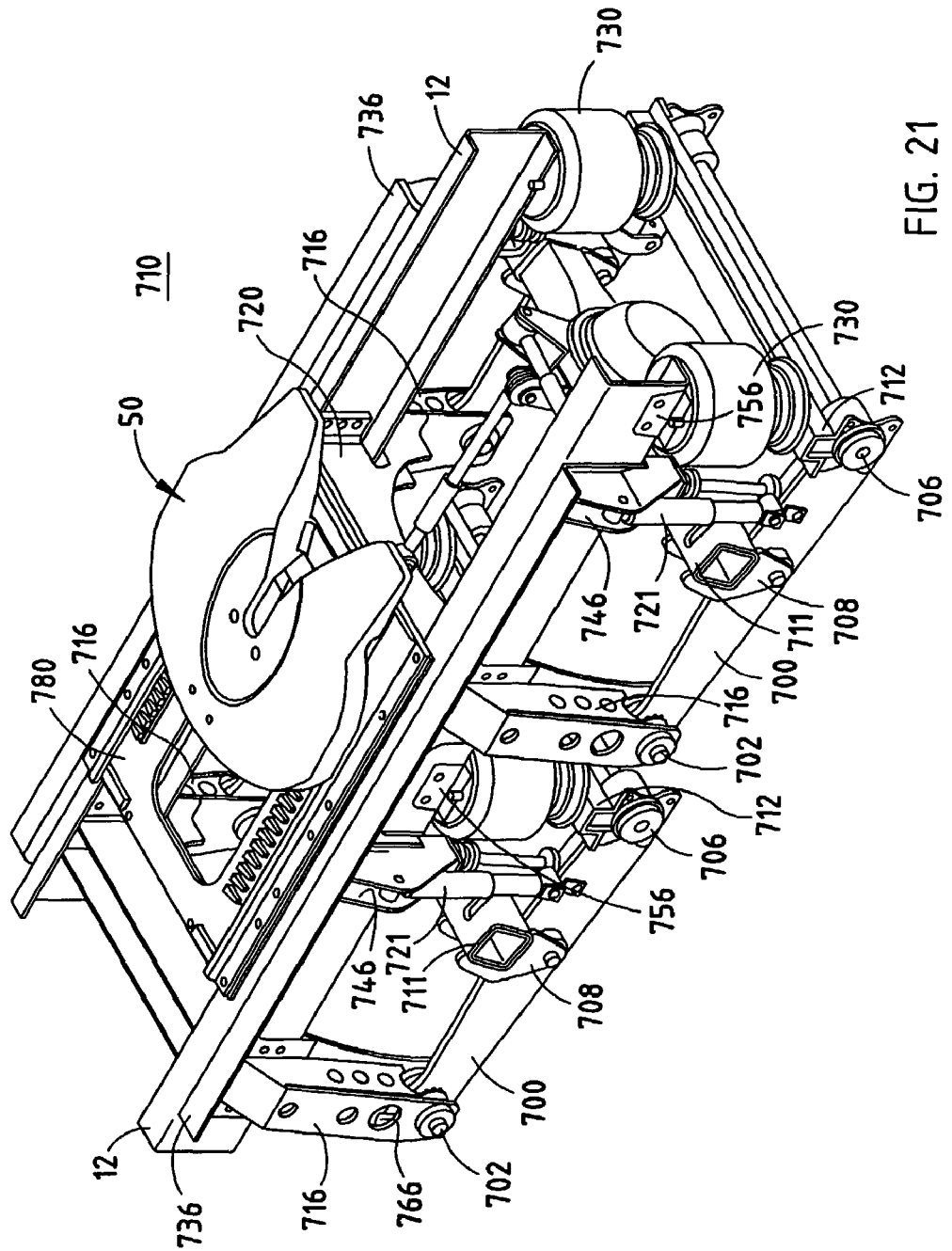
FIG. 21 is perspective view of the seventh mounting assembly of the present invention and conventional frame rails of a tractor.
Figure 22:
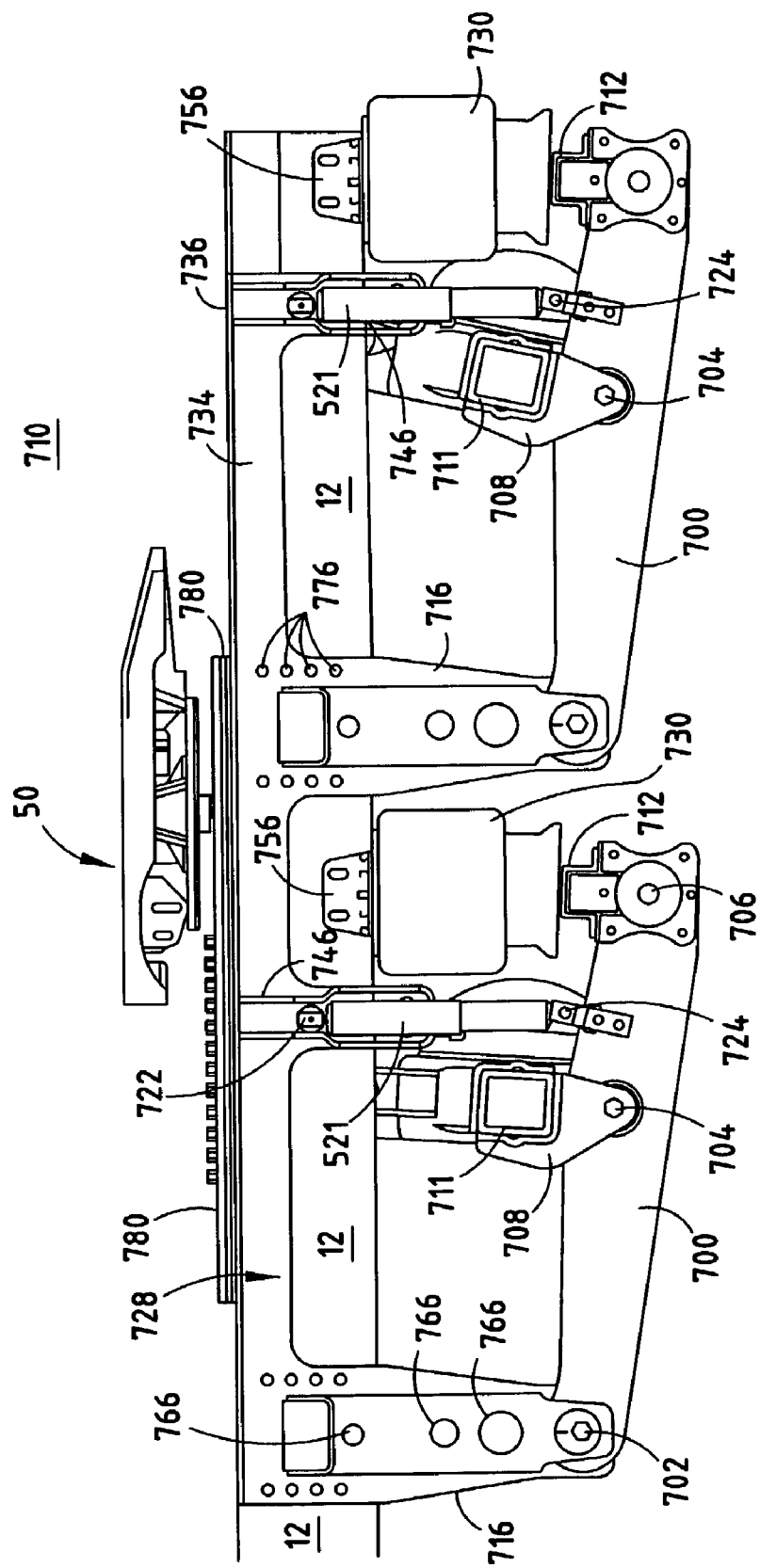
FIG. 22 is a side view of the seventh mounting assembly of the present invention and conventional frame rails of a tractor.
Figure 23:
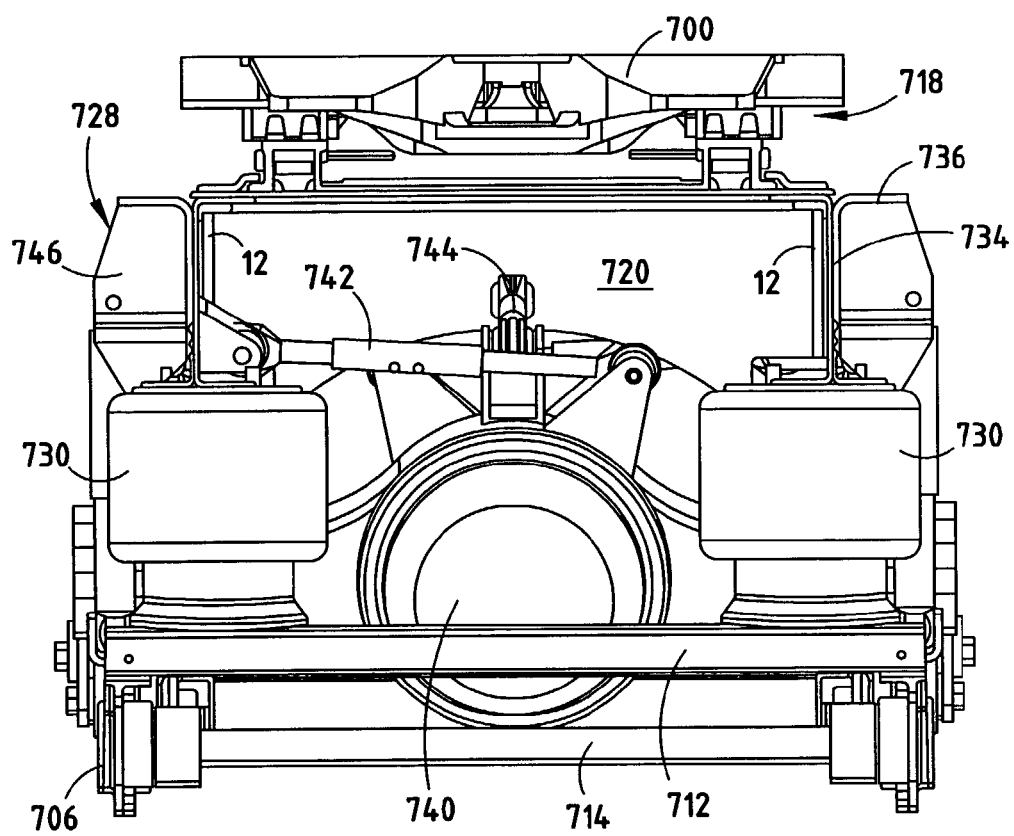
FIG. 23 is a rear view of the seventh mounting assembly of the present invention and conventional frame rails of a tractor.
Figure 24:
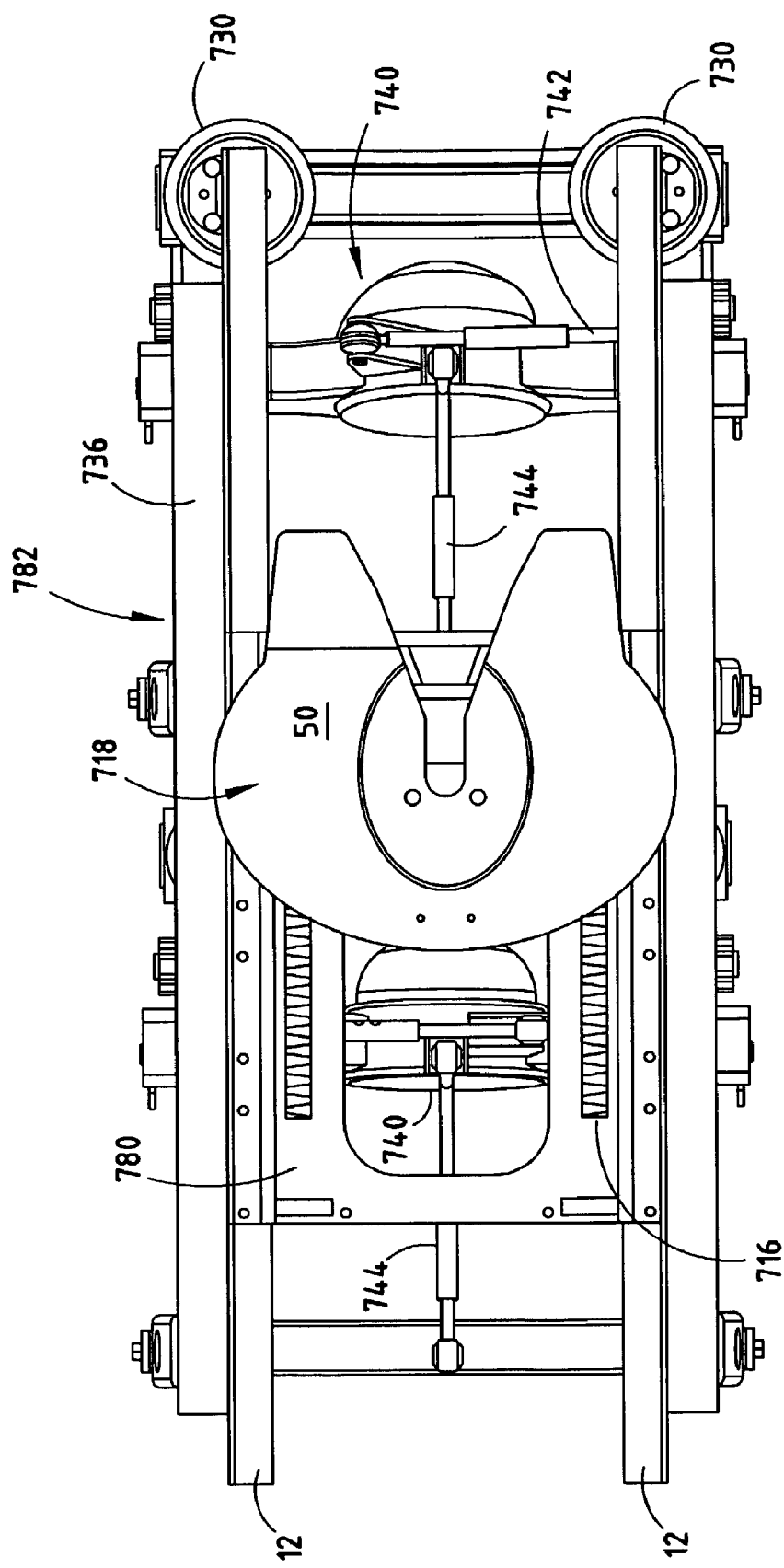
FIG. 24 is a plan view of the seventh mounting assembly of the present invention and conventional frame rails of a tractor.

The integral fifth wheel and frame suspension assembly 610 further encompasses an integrated pneumatic and electronic plug interface 621 pre-configured to be aligned with, and provide expeditious connection to, the pneumatic and electronic systems of the base vehicle, as shown in FIG. 19. The base vehicle is provided with a matching connector 623, for receiving the integrated plug interface 621. The integrated plug interface 621 provides connectors for each pneumatic requirements 631 as the drive train differential lock, air suspension components, brake system components, and other pneumatic requirements such as load sensing and tire inflation. The integrated plug interface 621 provides connectors for such electronic requirements 641 as drive sensors (oil temperature, RPM, torque output), air suspension (height and air pressure sensors, air controls), brake system components (control valves and connections for ABS system including reservoirs), and fifth wheel position and engagement sensing systems, load sensing, and tire inflation. The integrated plug interface 621 is further anticipated to contain other pneumatic and electronic systems connecting the base vehicle and the integral fifth wheel and frame suspension assembly 610 as known to those of ordinary skill in the art.

A seventh embodiment of the integrated fifth-wheel hitch assembly is shown in FIGS. 20-24 in which like numerals have been used to designate like parts. In this embodiment, a cross member 720 extends between and rigidly connects the truck frame rails 12. The integrated fifth wheel frame assembly 710 is configured to be lowered over the truck frame rail, or in instances where suspension components are preinstalled, it may be necessary to slide the integrated fifth wheel frame assembly 710 longitudinally onto the truck frame rails 12 from the rear of the truck frame rails 12.

The integrated fifth wheel frame assembly 710 comprises a fifth wheel carriage 780 and a pair of rail plates 728 depending from the fifth wheel carriage 780. The rail plates 728 comprise an upper flange 736 and a rail plate web 734, first suspension bracket 716, second suspension bracket 746 and third suspension bracket 756. The carriage 780 and the rail plates 728 are rigidly joined together by welding or other suitable fasteners. A pair of cross members 720 extend between the suspension brackets 716 and are rigidly joined thereto. The cross members are bolted to the frame rails 12 when the frame assembly 710 is assembled onto the frame rails 12.

A trailing arm 700 is pivotally mounted at one end to a first suspension bracket 716 through a conventional trailing arm pivot 702. The trailing arm 700 pivotally mounts an axle 711 through an axle bracket 708 and a trailing arm drive axle pivot 704 at an intermediate portion of the trailing arm 700. The axle housing 710 carries an axle (not shown) and is part of a drive axle assembly 740. A trailing arm air spring brace 706 is mounted to another end portion of the trailing arm 700 and mounts a cross brace 712. Air springs 730 are mounted to the cross brace 712. The air springs 730 are connected between the third suspension bracket 756 and to the trailing arm cross brace 712. A torsion beam 714 is rigidly mounted at each end to the air spring brace 706.

A trailing arm shock absorber 721 has an upper shock mount 722 connected to the second suspension bracket 746 and a lower shock mount 724 connected to the trailing arm 700 through bracket 724.

This seventh embodiment of the integrated fifth wheel frame assembly provides the original equipment manufacturer the flexibility of utilizing its own truck frame construction and drive train. The original equipment manufacturer can then use the integrated fifth wheel and frame suspension without modifying the truck frame itself.

The embodiment of FIGS. 20-24 includes a trailing arm 700, an axle 711 and an air spring 730. Although not shown in FIGS. 14-19, these same components are typically mounted to the suspension brackets 616 and between the trailing arm and the frame in the same manner as they are mounted to the brackets 716 in the embodiment of FIGS. 20-24.

In the forgoing description, it will be readily appreciated by those skilled in the art that modifications may be made to the invention without departing from the concepts disclosed herein. Such modifications are to be considered as included in the following claims, unless these claims by their language expressly state otherwise.

We claim:

1. A mounting assembly for mounting a trailer to a tractor comprising:
   a fifth wheel hitch comprising a hitch plate, at least one back rib, a peripheral flange, a main rib, skirts and at least two pairs of mounting ribs;
   the hitch plate defines a tapered mouth and throat for receiving a kingpin, the hitch plate having a bottom face;
   the at least one back rib extends from the bottom face of the hitch plate;
   the peripheral flange extends from a periphery of the bottom face of the hitch plate and is connected to ends of the at least one back rib;
   the main rib extends from the bottom face of the hitch plate between the at least one back rib and a portion of the peripheral flange, the main rib being connected to ends of the peripheral flange;
   the skirts extend from the hitch plate adjacent the at least one back rib; and
   the at least two pairs of mounting ribs are located interior of the peripheral flange and the at least one back rib, with each pair of mounting ribs including aligned apertures for accepting a mounting pin therein; and mounting brackets, the mounting brackets being inserted into a space between each pair of mounting ribs and configured to accept the mounting pin to connect the fifth wheel hitch to the mounting brackets; and a one-piece integral rear tractor portion including a horizontal support surface having the mounting brackets connected thereto and structural side frame sections supporting the horizontal support surface, the structural side frame sections including axle supporting components for connecting a tractor axle to the integral rear tractor portion.

2. A mounting assembly for mounting a trailer to a tractor comprising:

a fifth wheel hitch comprising a hitch plate, at least one back rib, a peripheral flange, a main rib, skirts and at least two pairs of mounting ribs;

the hitch plate defines a tapered mouth and throat for receiving a kingpin, the hitch plate having a bottom face;

the at least one back rib extends from the bottom face of the hitch plate;

the peripheral flange extends from a periphery of the bottom face of the hitch plate and is connected to ends of the at least one back rib;

the main rib extends from the bottom face of the hitch plate between the at least one back rib and a portion of the peripheral flange, the main rib being connected to ends of the peripheral flange;

the skirts extend from the hitch plate adjacent the at least one back rib; and the at least two pairs of mounting ribs are located interior of the peripheral flange and the at least one back rib, with each pair of mounting ribs including aligned apertures for accepting a mounting pin therein;

mounting brackets, the mounting brackets being inserted into a space between each pair of mounting ribs and configured to accept the mounting pin to connect the fifth wheel hitch to the mounting brackets; and an integral rear tractor portion including a horizontal support surface having the mounting brackets connected thereto and structural side frame sections supporting the horizontal support surface, the structural side frame sections including axle supporting components for connecting a tractor axle to the integral rear tractor portion;

wherein the axle supporting components include at least one link mount, at least one air bag and a plurality of suspension links connected to the link mount and the at least one air bag, whereby each suspension link is configured to rotate about the at least one link mount.

3. The mounting assembly for mounting the trailer to the tractor of claim 2, wherein:

the at least one link mount comprises two link mounts connected to each one of the structural side frame sections.

4. The mounting assembly for mounting the trailer to the tractor of claim 3, wherein:

the at least one air bag includes two air bags.

5. The mounting assembly for mounting the trailer to the tractor of claim 2, further including:

a shock absorber extending between each suspension link and the structural side frame sections.

6. The mounting assembly for mounting the trailer to the tractor of claim 5, wherein:

a shock absorber bracket is connected to the structural side frame sections for each shock absorber; and each shock absorber bracket is also connected to the shock absorber.

7. A semi-tractor comprising:

a one-piece integral rear tractor portion including a horizontal support surface and structural side frame sections supporting the horizontal support surface, the structural side frame sections including axle supporting components for connecting a tractor axle to the integral rear tractor portion;

a fifth wheel hitch having mounting areas, the mounting areas have a center distance therebetween of less than 30 inches;

mounting brackets connected to the horizontal support surface, the mounting brackets defining a mounting distance therebetween, the mounting brackets engaging the mounting areas of the fifth wheel hitch.

8. The semi-tractor of claim 7, wherein:

the center distance of the mounting areas is approximately 20 inches.

9. The semi-tractor of claim 7, wherein:

the axle supporting components include at least one link mount and at least one suspension link connected to each at least one link mount, whereby each suspension link is configured to rotate about the at least one link mount.

10. A semi-tractor comprising:

a one-piece integral rear tractor portion including a horizontal support surface and structural side frame sections supporting the horizontal support surface, the structural side frame sections including axle supporting components for connecting a tractor axle to the integral rear tractor portion;

a fifth wheel hitch having mounting areas, the mounting areas have a center distance therebetween of less than 30 inches; and mounting brackets connected to the horizontal support surface, the mounting brackets defining a mounting distance therebetween, the mounting brackets engaging the mounting areas of the fifth wheel hitch;

wherein the fifth wheel hitch comprises:

a hitch plate defining a throat for receiving a kingpin, the hitch plate having a bottom face;

at least one back rib extending from the bottom face of the hitch plate;

a peripheral flange extending from a periphery of the bottom face of the hitch plate and connected to ends of the at least one back rib;

a main rib extending from the bottom face of the hitch plate between the at least one back rib and a portion of the peripheral flange, the main rib being connected to ends of the peripheral flange;

skirts extending from the hitch plate adjacent the at least one back rib and defining a tapered mouth leading to the throat; and at least two pairs of mounting ribs located interior of the peripheral flange and the at least one back rib, each pair of mounting ribs including aligned apertures for accepting a mounting pin therein, whereby a mounting bracket can be inserted into a space between the mounting ribs of each pair of mounting ribs and the mounting pin can be placed through the aligned apertures and the mounting bracket to connect the fifth wheel hitch to a tractor.

11. The semi-tractor of claim 10, wherein:

the fifth wheel skirt further includes skirt ribs.

12. The semi-tractor of claim 10, wherein:
the hitch plate is configured to support a vertical load of at least 66,000 pounds.

13. The semi-tractor of claim 10, wherein:
the at least two pairs of mounting ribs extend between and are attached to both the main rib and the at least one back rib.

14. A semi-tractor comprising:
an integral rear tractor portion including a horizontal support surface and structural side frame sections supporting the horizontal support surface, the structural side frame sections including axle supporting components for connecting a tractor axle to the integral rear tractor portion;
a fifth wheel hitch having mounting areas, the mounting areas have a center distance therebetween of less than 30 inches;
mounting brackets connected to the horizontal support surface, the mounting brackets defining a mounting distance therebetween, the mounting brackets engaging the mounting areas of the fifth wheel hitch;
wherein the axle supporting components include at least one link mount, at least one air bag and a plurality of suspension links connected to the link mount and the at least one air bag, whereby each suspension link is configured to rotate about the at least one link mount.

15. The semi-tractor of claim 14, wherein:
the at least one link mount comprises two link mounts connected to each one of the structural side frame sections.

16. The semi-tractor of claim 15, wherein:
the at least one air bag includes two air bags.

17. The semi-tractor of claim 14, further including:
a shock absorber extending between each suspension link and the structural side frame sections.

18. The semi-tractor of claim 17, wherein:
a shock absorber bracket is connected to the structural side frame sections for each shock absorber; and
each shock absorber bracket is also connected to the shock absorber.

19. A mounting assembly for mounting a trailer to a tractor comprising:
a fifth wheel hitch comprising a hitch plate, at least one back rib, a peripheral flange, a main rib, skirts and at least two pairs of mounting ribs;
the hitch plate defines a tapered mouth and throat for receiving a kingpin, the hitch plate having a bottom face;
the at least one back rib extends from the bottom face of the hitch plate;
the peripheral flange extends from a periphery of the bottom face of the hitch plate and is connected to ends of the at least one back rib;
the main rib extends from the bottom face of the hitch plate between the at least one back rib and a portion of the peripheral flange, the main rib being connected to ends of the peripheral flange;
the skirts extend from the hitch plate adjacent the at least one back rib; and
the at least two pairs of mounting ribs are located interior of the peripheral flange and the at least one back rib, with each pair of mounting ribs including aligned apertures for accepting a mounting pin therein;
mounting brackets, the mounting brackets being inserted into a space between each pair of mounting ribs and configured to accept the mounting pin to connect the fifth wheel hitch to the mounting brackets; and
a rear tractor portion including a support surface having the mounting brackets connected thereto and side frame sections supporting the support surface, the side frame sections including axle supporting components for connecting a tractor axle to the rear tractor portion;
wherein the axle supporting components include at least one link mount and at least one suspension link connected to each at least one link mount, whereby each suspension link is configured to rotate about the at least one link mount; and
wherein the at least two pairs of mounting ribs extend between and are attached to both the main rib and the at least one back rib.

\* \* \* \* \*